Nov. 5, 1935.   R. HOFGAARD   2,019,704
ELECTRICAL CALCULATING MACHINE
Filed March 11, 1930   12 Sheets-Sheet 1
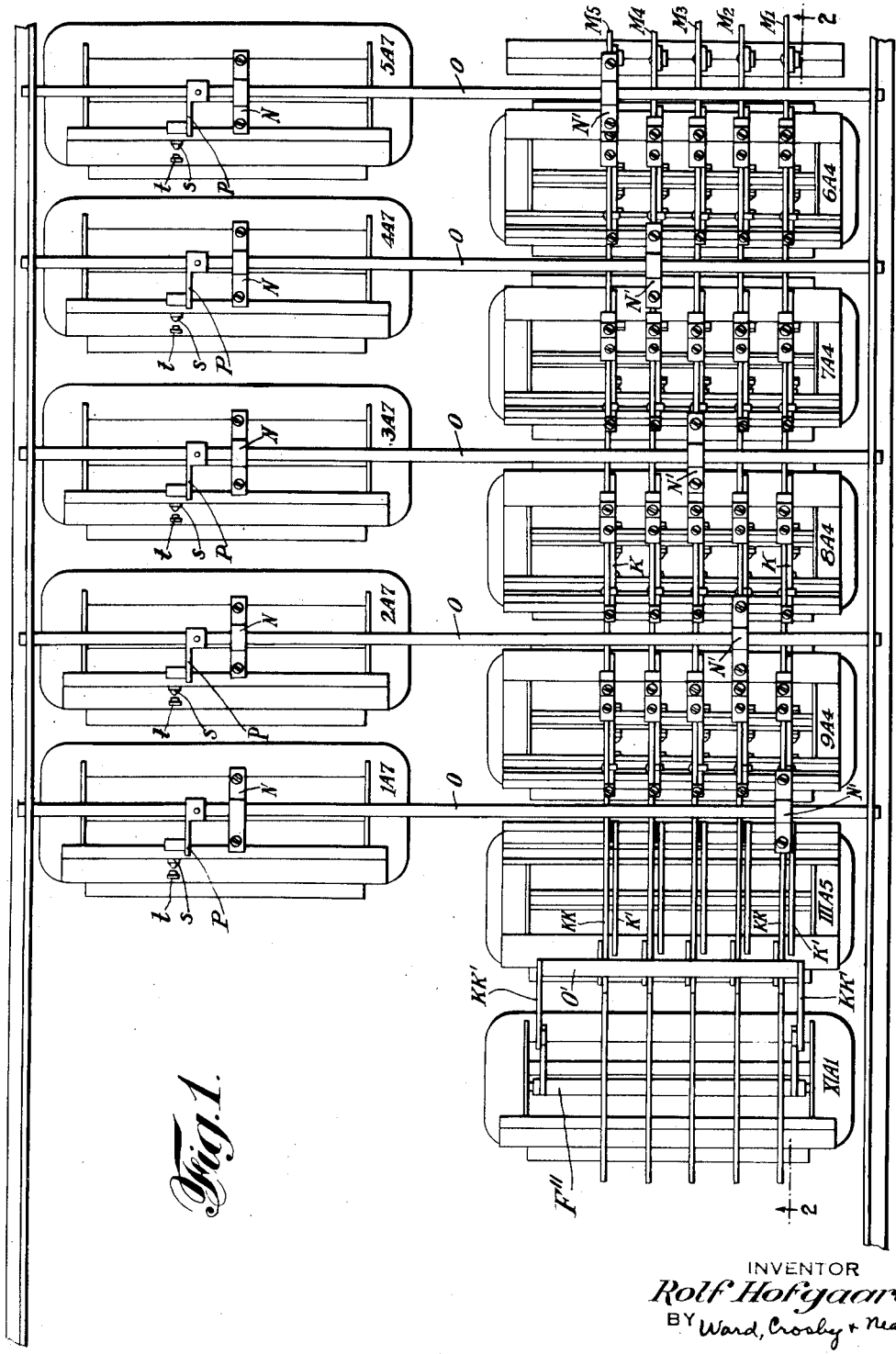
INVENTOR
*Rolf Hofgaard*
BY *Ward, Crosby + Neal*
HIS ATTORNEYS

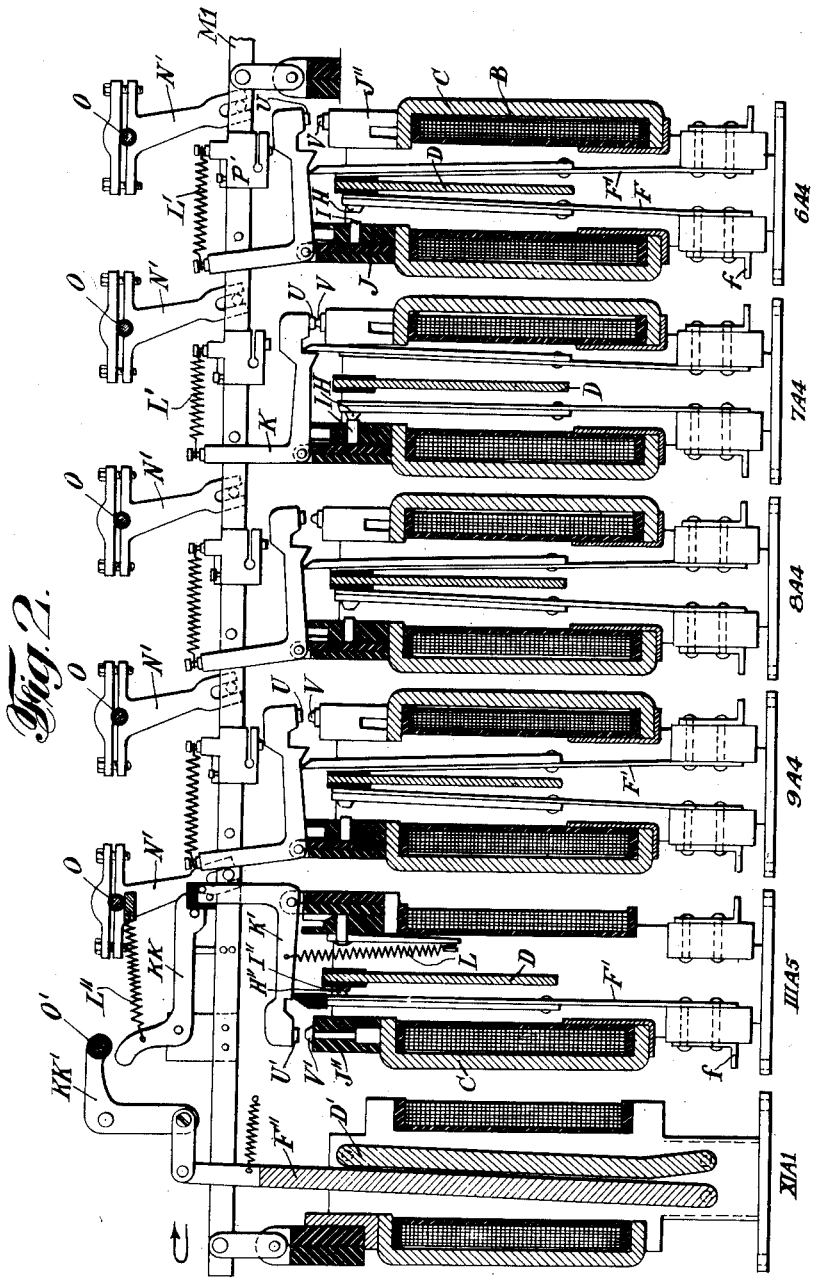

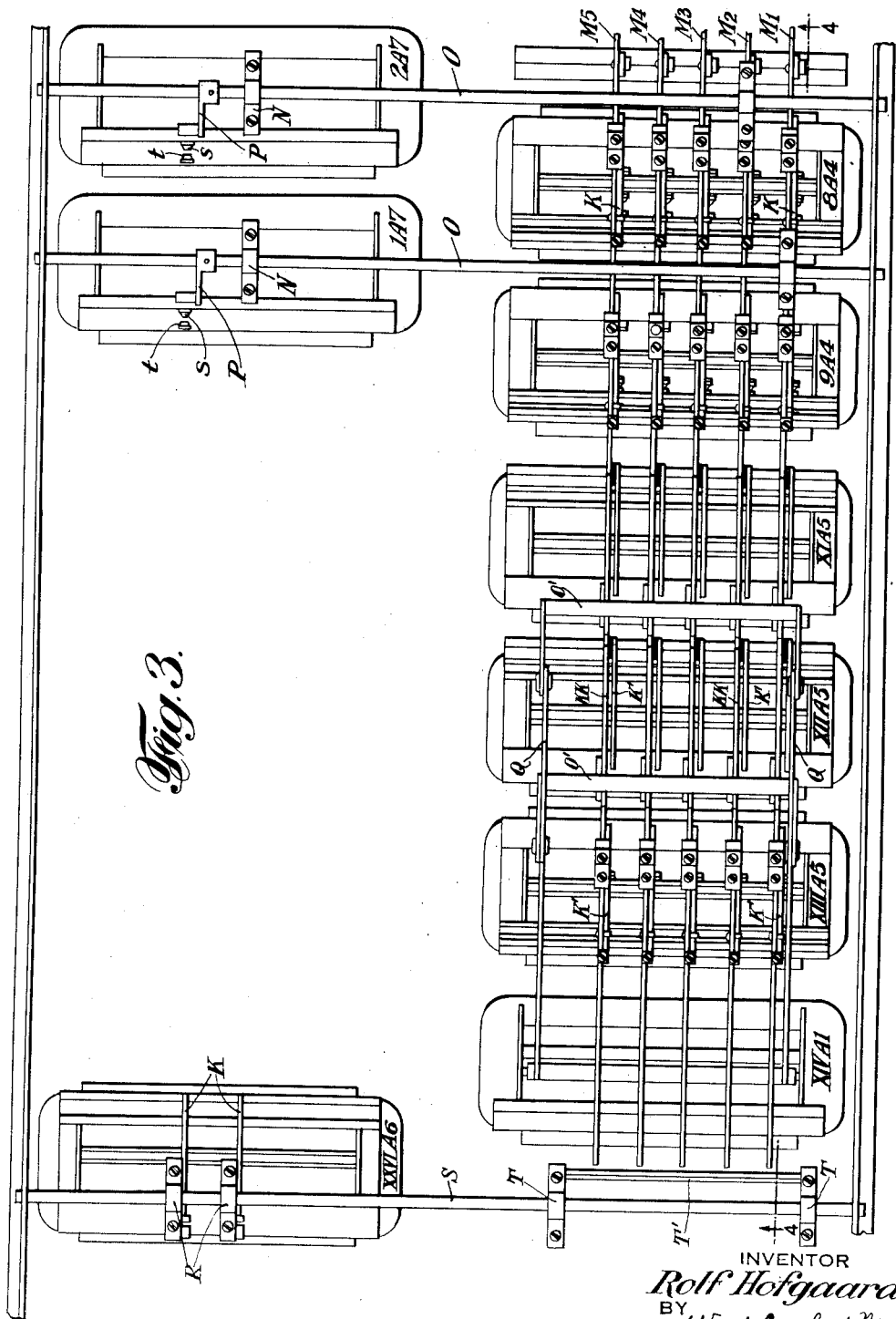

Nov. 5, 1935.  R. HOFGAARD  2,019,704
ELECTRICAL CALCULATING MACHINE
Filed March 11, 1930   12 Sheets-Sheet 4
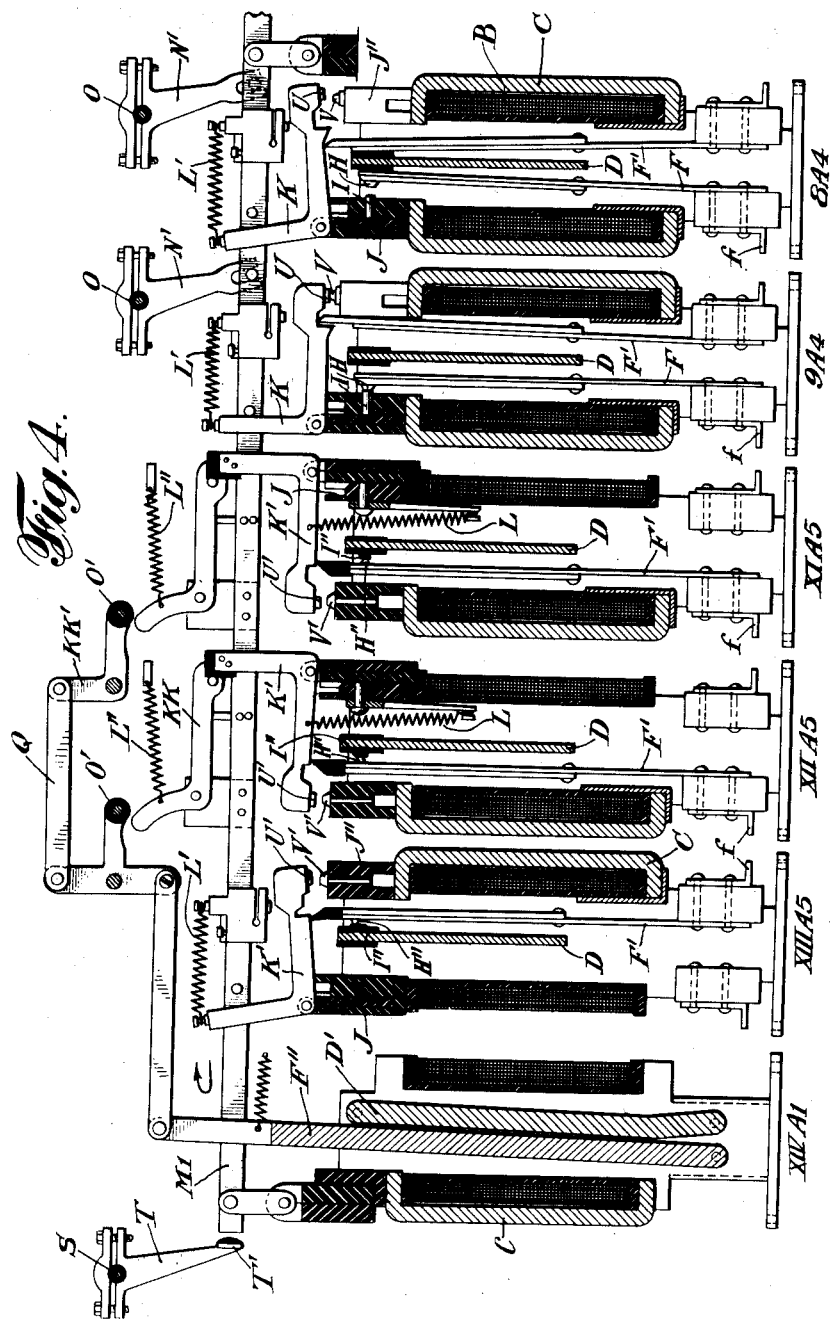
INVENTOR
Rolf Hofgaard
BY Ward, Crosby & Neal
HIS ATTORNEYS Nov. 5, 1935.     R. HOFGAARD     2,019,704
ELECTRICAL CALCULATING MACHINE
Filed March 11, 1930     12 Sheets-Sheet 5
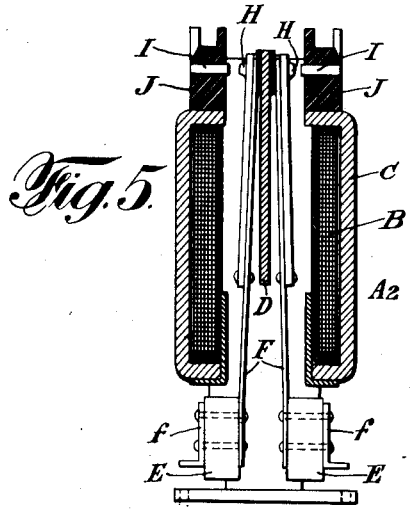
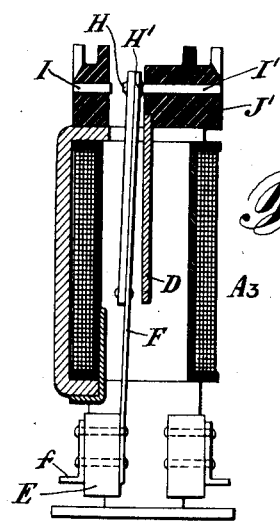
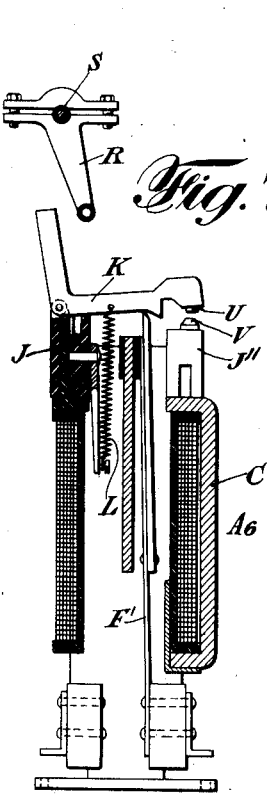
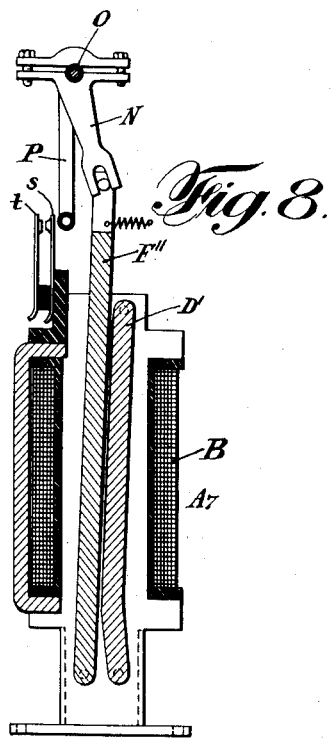
INVENTOR
Rolf Hofgaard
BY Ward, Crosby + Neal
HIS ATTORNEYS Nov. 5, 1935.     R. HOFGAARD     2,019,704
ELECTRICAL CALCULATING MACHINE
Filed March 11, 1930     12 Sheets-Sheet 6
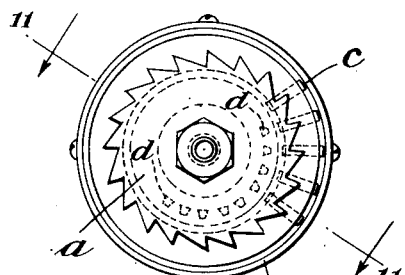
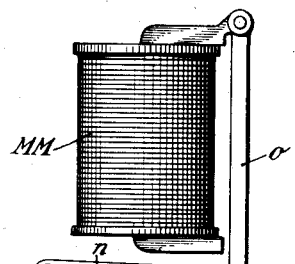
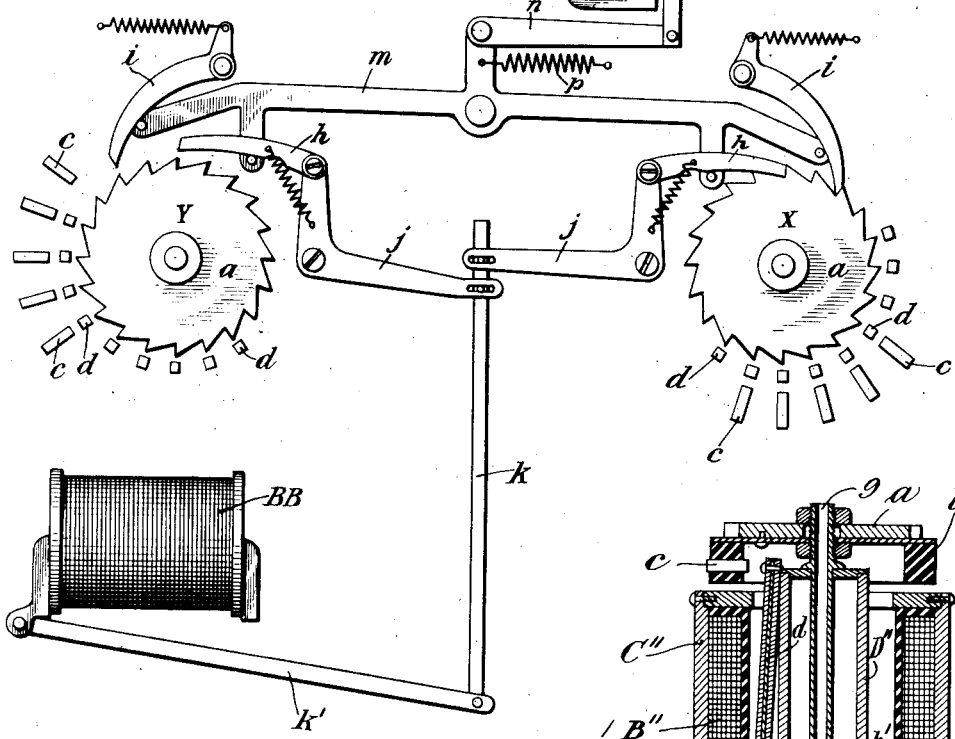
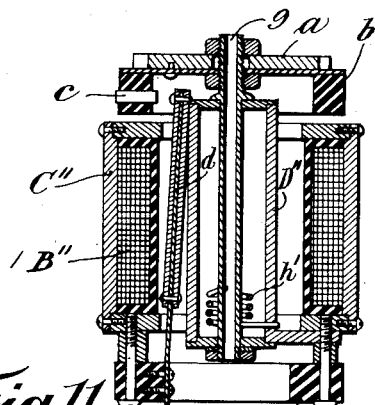
INVENTOR
*Rolf Hofgaard*
BY *Ward, Crosby & Neal*
HIS ATTORNEYS Nov. 5, 1935.　　　　　R. HOFGAARD　　　　　2,019,704
ELECTRICAL CALCULATING MACHINE
Filed March 11, 1930　　12 Sheets-Sheet 7
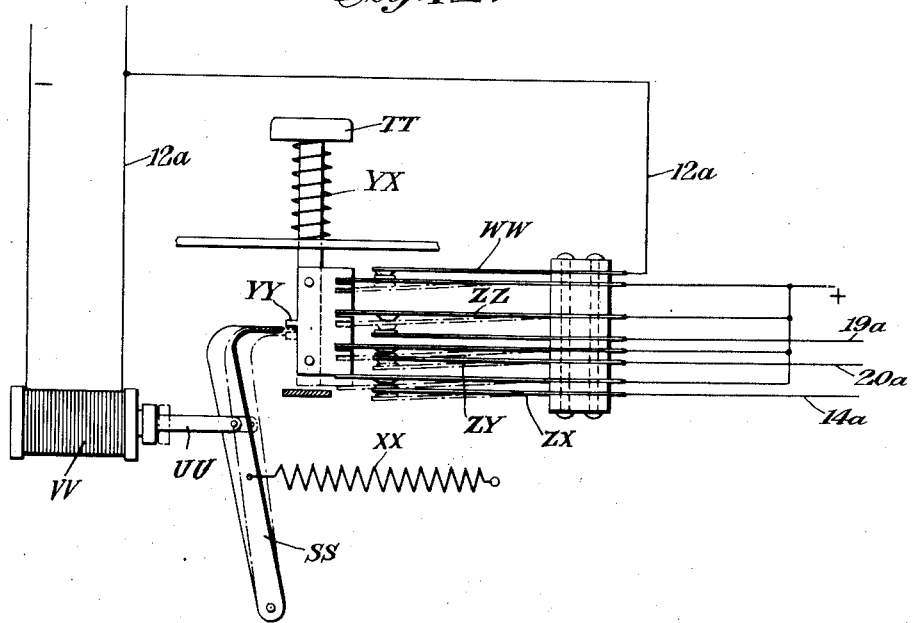
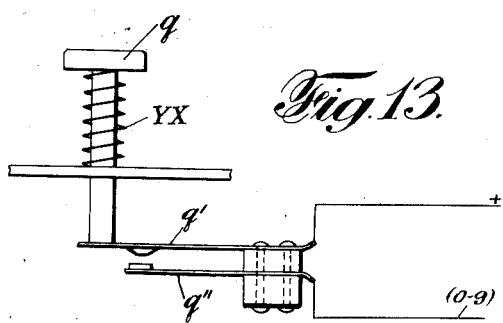
INVENTOR
Rolf Hofgaard
BY Ward, Crosby & Neal
HIS ATTORNEYS Nov. 5, 1935.　　　R. HOFGAARD　　　2,019,704
ELECTRICAL CALCULATING MACHINE
Filed March 11, 1930　　12 Sheets-Sheet 8

INVENTOR
Rolf Hofgaard
BY Ward, Crosby & Neal
HIS ATTORNEYS

Nov. 5, 1935.  R. HOFGAARD  2,019,704
ELECTRICAL CALCULATING MACHINE
Filed March 11, 1930    12 Sheets-Sheet 9
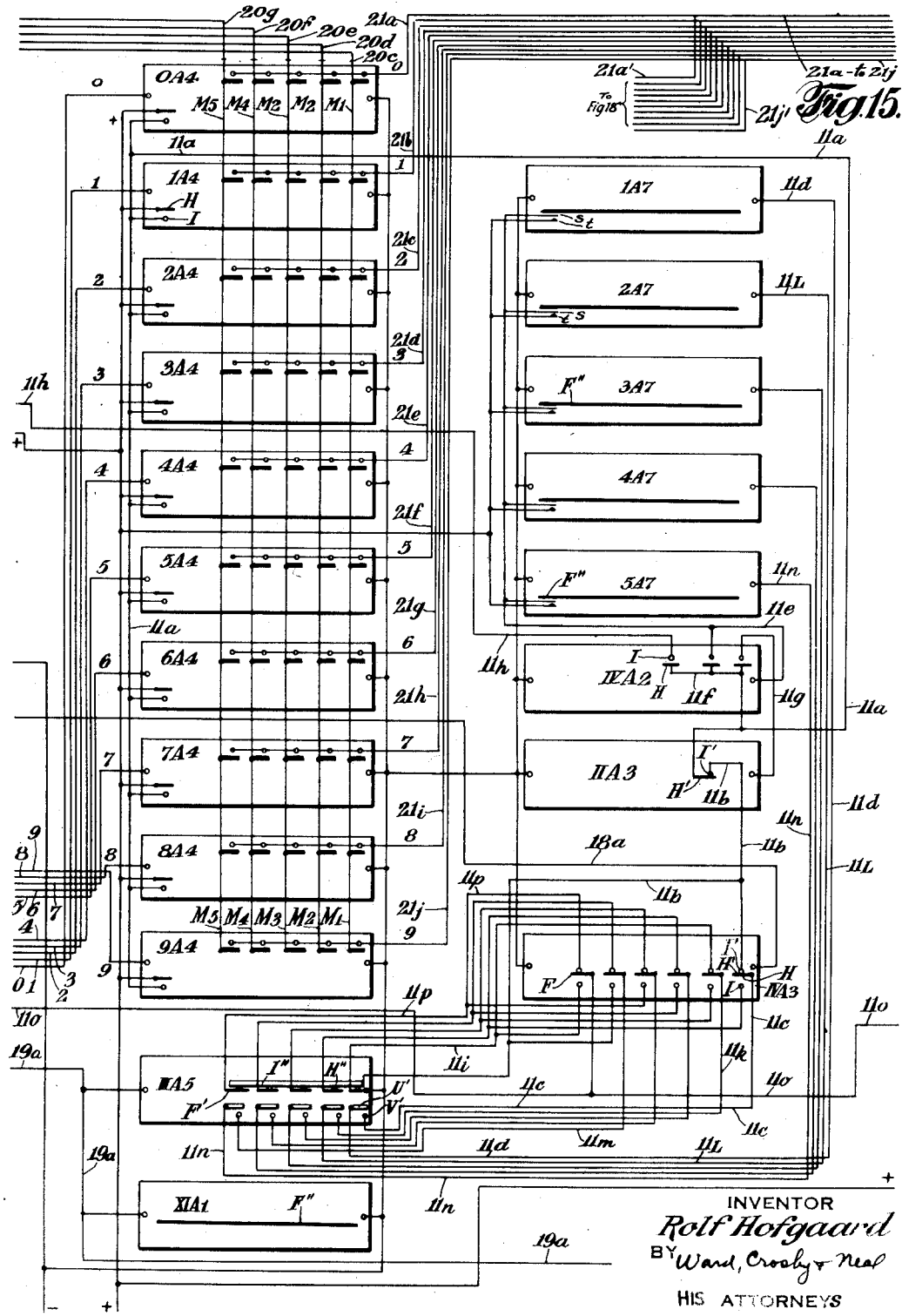
INVENTOR
Rolf Hofgaard
BY Ward, Crosby & Neal
HIS ATTORNEYS

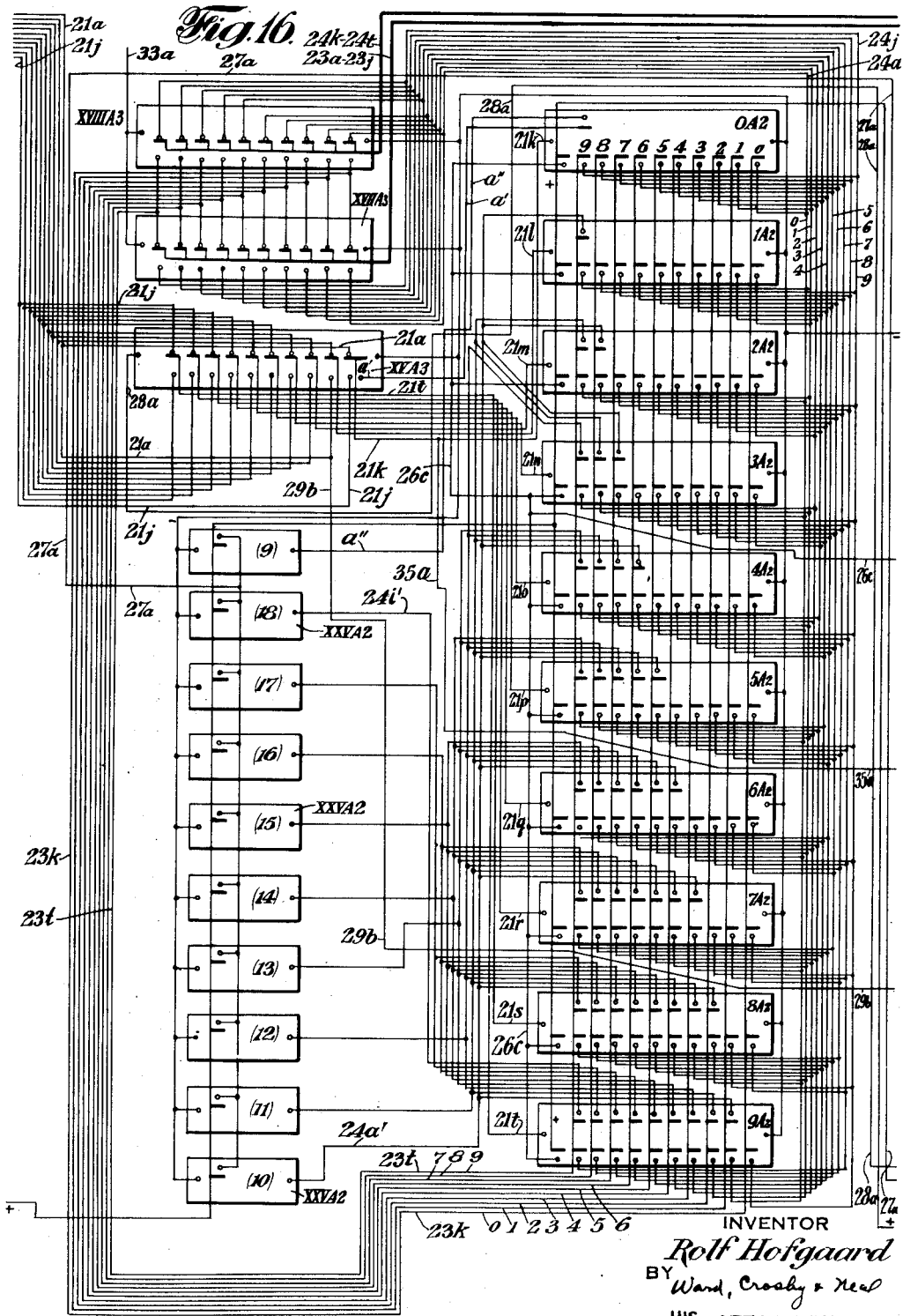

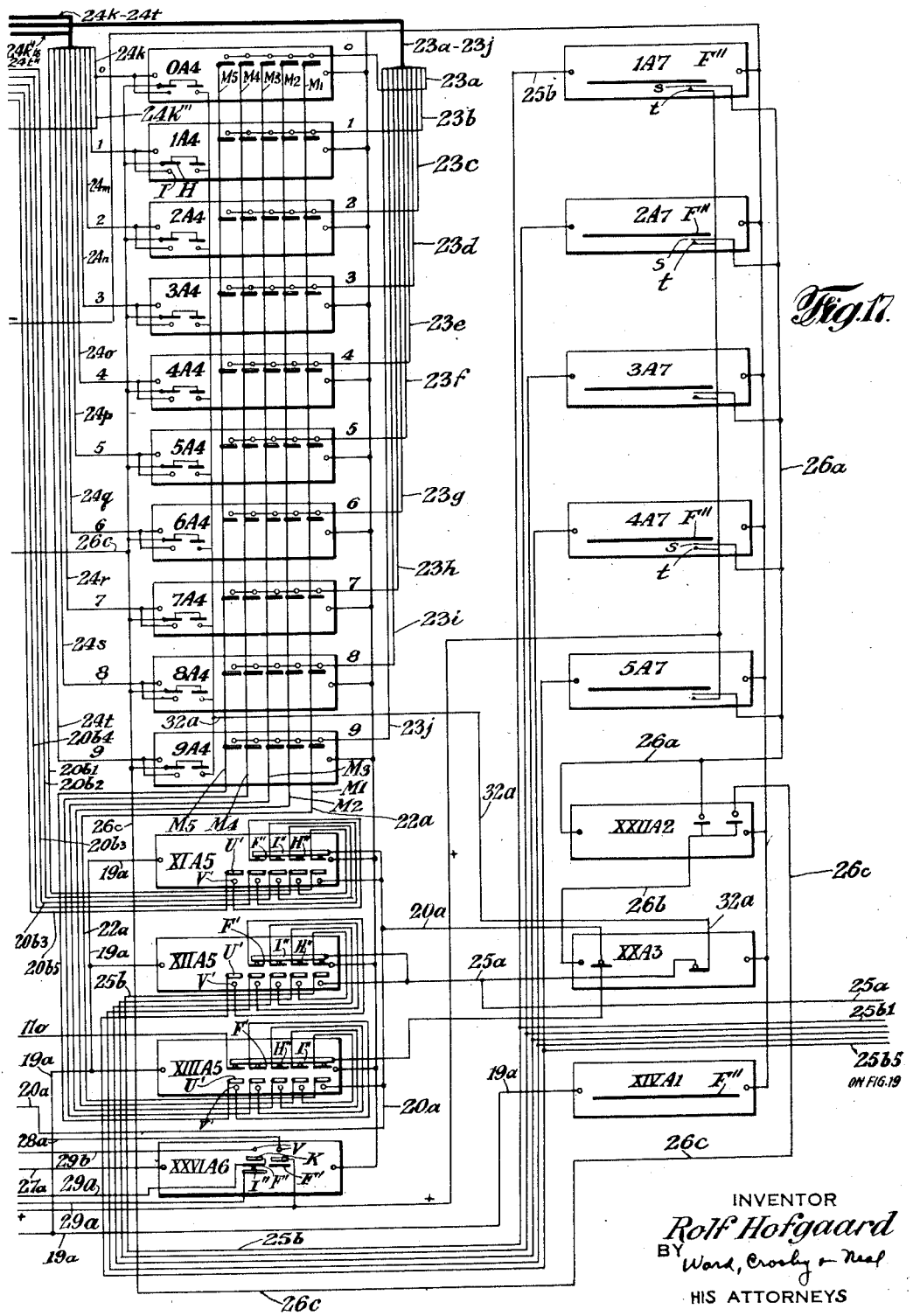

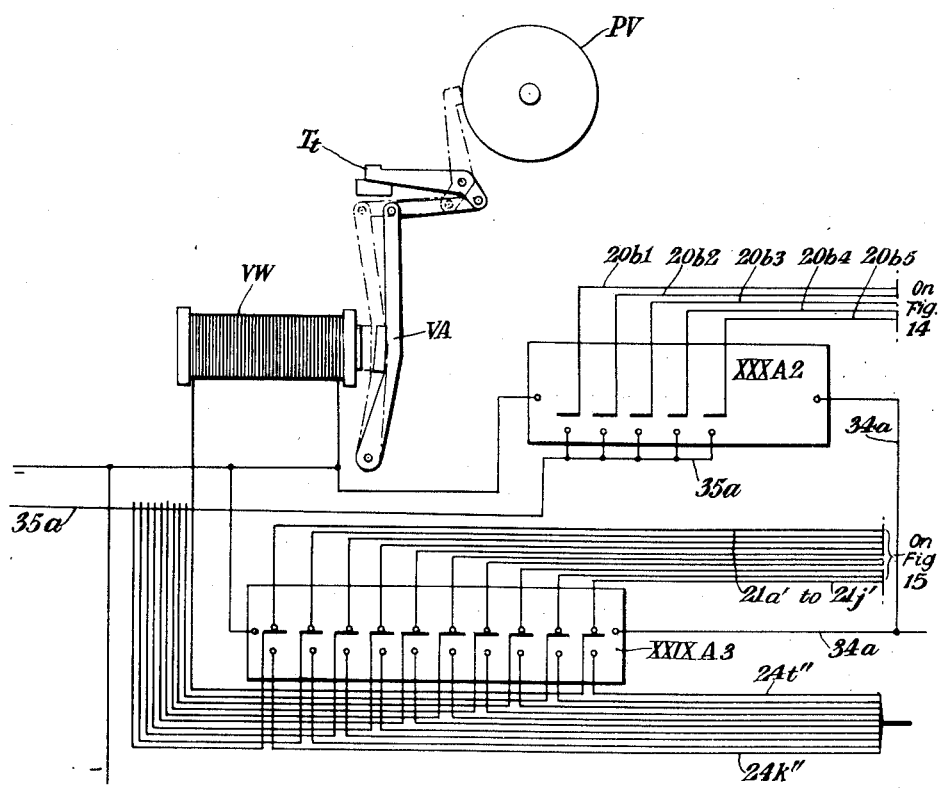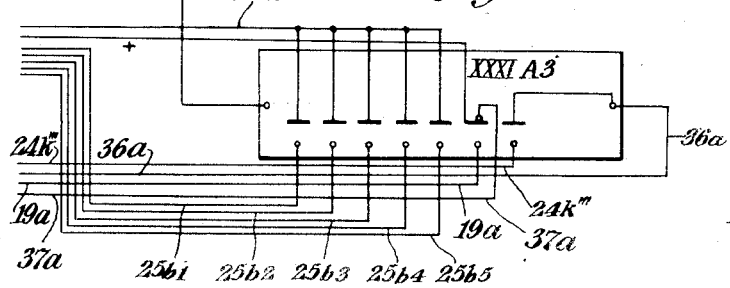

Patented Nov. 5, 1935

2,019,704

UNITED STATES PATENT OFFICE 2,019,704

ELECTRICAL CALCULATING MACHINE

Rolf Hofgaard, Bridgeport, Conn., assignor, by mesne assignments, to The National Cash Register Company, Dayton, Ohio, a corporation of Maryland Application March 11, 1930, Serial No. 434,848

44 Claims. (Cl. 235—92)

This invention relates to electrical calculating machines of the type shown in my copending applications Serial No. 346,292 filed March 12, 1929, Serial No. 688,564 filed January 25, 1924, and Serial No. 221,330 filed September 22, 1927, which have resulted in Patents Nos. 1,876,296; 1,876,294; and 1,876,293, respectively.

Among the objects of this invention are the provision of means for effecting a set-up in a primary register of a number under the control of keys as the number contained therein is being transmitted to a secondary register through an adding and subtracting mechanism controlled conjointly by the primary and secondary registers; the provision of means for permitting the entry of the digits of successive numbers in different directions in the primary register; the provision of means for printing numbers as they are transmitted to the secondary register before addition or subtraction; the provision of means for printing numbers in the secondary register and for re-registering the numbers in the secondary register; the provision of an improved embodiment of a reversing mechanism which will cause numbers set up in the primary register, by operating numeral keys in the usual order from left to right, to be transmitted to the secondary register through the adding and subtracting mechanism in the order from right to left; the provision of means for restoring the tabulating relays of both registers before transmission of a number is initiated; the provision of a separate denominational operating relay for each denominational order of locking bars; the provision of means for controlling said denominational operating relays of the primary register to operate from right to left and left to right alternately in succession; the provision of improved means for clearing the secondary register and registering zeros therein; and generally the provision of improved means for carrying out the processes of computations.

Numerous other objects of structural features and combinations of features will appear from the description taken in connection with the accompanying drawings which illustrate for purposes of disclosure one of the embodiments of this invention.

In the drawings, Fig. 1 is a top plan view of the primary register,

Fig. 2 is a section on the line 2—2 of Fig. 1,

Fig. 3 is a top plan view of the secondary register,

Fig. 4 is a section on the line 4—4 of Fig. 3,

Figs. 5, 6 and 7 show several types of connecting and switching relays,

Fig. 8 shows one of the denominational power operating relays,

Fig. 9 is a diagrammatic showing of the reversing drum mechanism,

Fig. 10 is an end view of one of the drums in Fig. 9,

Fig. 11 is a section on the line 11—11 of Fig. 10,

Fig. 12 shows one of the functional control keys,

Fig. 13 shows one of the numeral keys, and

Figs. 14, 15, 16, 17, 18 and 19 show a general wiring diagram of my invention.

Figure 14:
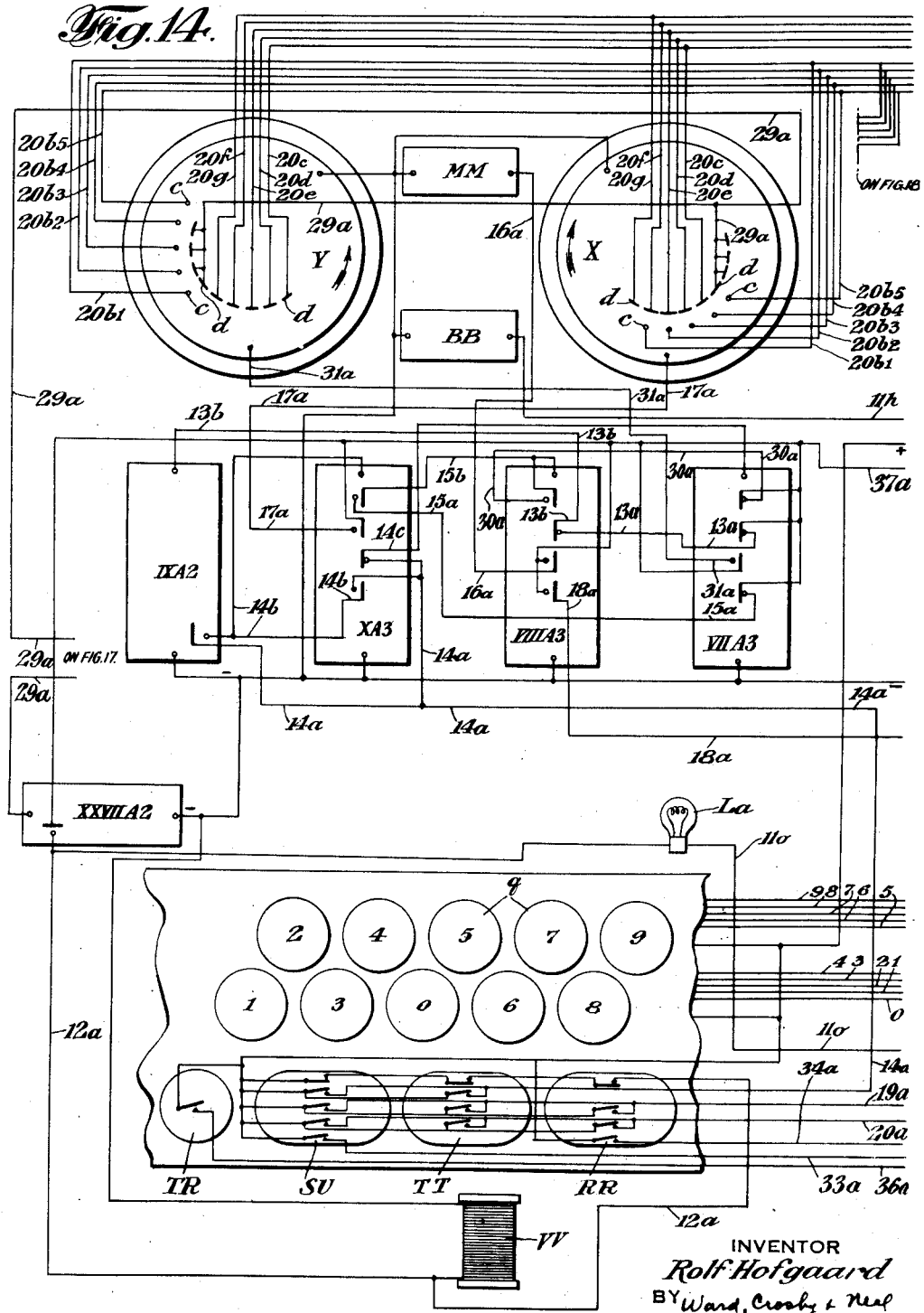

Referring to Figs. 14, 15, 16, 17, 18 and 19, the electrical calculating machine of my invention comprises a keyboard, Fig. 14, which includes numeral keys and function control keys; a primary register, Fig. 15, in which amounts are stored under the control of the keyboard; a secondary register, Fig. 17, in which amounts are stored under the control of the adding and subtracting mechanism, Fig. 16, which in turn is controlled by the primary register, Fig. 15, and the secondary register, Fig. 17; a drum reversing mechanism, Fig. 14, for controlling the transmission of amounts from the primary register to the secondary register in the reverse order in which they were entered into the primary register; a printing mechanism, as in Fig. 18, for printing amounts as they are transmitted from the primary register to the secondary register or the results of computations registered in the secondary register; and a means such as shown in Fig. 19 for clearing the machine.

Types of relays

The various forms of relays used in this machine are shown in Figs. 2, 4, 5, 6, 7 and 8. Each of these relays includes a coil B, a soft iron cover C, a central core D, and an armature F.

The relay A2, shown in Fig. 5, is a contact closing relay and includes a conducting armature or armatures F on each side of the central core D. The armatures F preferably comprise a bronze supporting spring and a magnetizable element of soft iron. The lower ends of these armatures are supported by blocks of insulating material E being preferably secured thereto by rivets extending through the blocks and through clips f. The upper ends of the armatures F are provided with contact points H adapted to engage with contacts I in blocks J of insulating material supported on the upper end of the cover C. The armatures F are preferably insulated from the core D by two strips of insulating material, as shown.

The armatures F in this relay are conducting armatures and complete circuit connections from the clips $f$ to the contacts I to which are secured wires from cables which may be supported in channels formed in the upper side of the blocks J. If desired the clips $f$ may be connected in series to the same wire and the contacts I may be connected to different wires having different values as in the case of the computing relays 0A2 to 9A2, Fig. 16.

The relay A3 shown in Fig. 6 is a switching relay and has only one set of conducting armatures F each of which may complete a circuit from the clip $f$ to a contact I or to a contact I' supported in a block J' of insulating material. When the relay is deenergized the circuit is made from $f$ to I' and when it is energized the circuit is made from $f$ to I. This type of relay is used as a switching relay such as relays XVIIA3 and XVIIIA3, Fig. 16, to control addition and subtraction.

In the form of relay A1, indicated as XIA1 in Figs. 1, 2 and 15 and as XIVA1 in Figs. 3, 4 and 17, the core D' cooperates with an operating armature F'' and this armature is merely a power operating means and is not a part of any circuit connections.

The relay A4, shown in Figs. 1, 2, 3, 4, 15 and 17 as 0A4 to 9A4 comprises an armature F of the same type as that shown in Fig. 5, which is adapted to complete circuit connections from clip $f$ through the points H and I. This relay also includes a plurality of denominational armatures F' which are not current-conducting and which are extended upwardly beyond the core D to control the position of a bell crank member K which is provided with a contact point U adapted to make contact with a contact V carried in a block J'' of insulating material supported on the relay, as shown. When the armature F' is attracted by the cover C and is permitted to move outwardly it will assume the position shown in the relay 7A4, Fig. 2, in which position it permits the bell crank K to drop down and engage its contact U with the contact V. This closes a circuit from the bell crank K over contacts U, V, to a line that may be located in a channel of the block J''. This type of relay is used as a digit storing relay in the primary and secondary registers as will be described later. The bell crank K is supported on a block of insulating material as shown.

The relay A5, shown in Figs. 1, 2, and 15 as IIIA5 and in Figs. 3, 4 and 17 as XIA5, XIIA5 and XIIIA5 comprises denominational movable armatures F', the upper portions of which are provided with insulating material. This armature is a conducting armature completing a circuit from the clip $f$ through contacts H'' and I''. These contact points I'' are all portions of a strip of conducting material insulated from the core D. When the armature F' is moved outwardly upon energization of the relay, a bell crank member K' is permitted to be drawn down by its spring L to engage its contact U' with a fixed contact V' supported in a block of insulating material J'' on top of the cover C of the relay. When the contacts U' and V' are engaged, a circuit connection is completed in the case of relays IIIA5, XIA5 and XIIA5 from a line which may be located in the channel of the block of insulating material J and connected to a pin which supports an anchorage for one end of the spring L, through the spring L, bell crank K', contacts U', V', to a line which may be located in the channel of the block J''. The bell crank K' is pivoted on a block of insulating material as shown.

Relay A6, shown in Fig. 7, is similar to the relay A4, shown in Figs. 2 and 4, except that the circuit in this instance is made from a wire in the channel of the block J through the spring L, bell crank K, contacts U and V, to a wire in the channel in the block J''. This relay is used as a transfer controlling relay XXVIA6, Fig. 17.

The relay A7, shown in Fig. 8, comprises in addition to the core D' and the movable armature F'' shown in relay A1, a pair of closing contacts $s$ and $t$ for completing circuit connections, as will be described later. The armature F'' operates an arm N secured to shaft O which carries an arm P the end of which is adapted to close the contacts $s$ and $t$ as the relay is energized. The arms N and P are insulated from the shaft O and the arm P is insulated from the contact $s$. This relay is used in the primary and secondary relays to move the locking bars later referred to, and is indicated in Figs. 1, 3, 15 and 17 as 1A7 to 5A7.

The relay XIIIA5, Figs. 3, 4 and 17, is similar to the relays XIA5 and XIIA5 except that its bell cranks K' are in electrical contact with the locking bars as indicated by the line 22a, Fig. 17. Armatures F' will be moved outwardly beyond the deep notch in the hooks K' so that the contacts U', V', will not be closed until the armatures F' have moved backward after deenergization of this relay. As the locking bars are moved to the left, Fig 4, and near the end of their movement, the hooks K' will be lifted and the spring armatures will spring back to close the contacts H'', I'', and hold the hook K' raised to prevent closing of the contacts U', V', as long as this relay remains deenergized.

*Primary register*

The primary register, Fig. 15, includes ten digit relays of the A4 form, designated 0A4—9A4, a tabulating relay A5, designated as IIIA5, an operating relay A1, designated as XIA1, denominational operating relays A7, designated as 1A7 to 5A7, a contact closing relay A2, designated as IVA2, and switching relays A3, designated as IIA3 and IVA3.

Figs. 1 and 2 show the relays A1, A4, A5 and A7 and their mechanical connections. As will be described later, any one of the digit storing relays 0A4—9A4, of which only four are shown in Figs. 1 and 2, will upon depression of a corresponding numeral key be energized and will through its free armature F and contacts H, I complete a circuit to one of the denominational operating relays 1A7—5A7. The drawings for purposes of illustration show a machine for handling numbers of five denominations.

Energization of one of the denominational operating relays will move its corresponding locking bar M1—M5 to the left, Figs. 1 and 2, which raises all of the hooks K associated with this bar to permit the associated armature F' of the energized digit storing relay 0A4—9A4 to be moved outwardly into the position shown in relay 7A4, in which position it will permit the bell crank K to close a circuit at contacts U and V. The bell cranks K are electrically connected to the locking bar which operates them. These bell cranks are moved counter-clockwise by pins on the locking bar, and clockwise by springs L' secured to the bell cranks and bar. The locking bars may be suitably supported on blocks of insulating material as shown.

The operating relays 1A7 to 5A7, Fig. 1, and A7 (Fig. 8) when energized rock the shafts O which as shown in Figs. 1 and 2 operate the locking bars M1 to M5, by means of arms N' secured to and insulated from the shaft O, and each engaging a pin on the corresponding locking bar.

Each locking bar carries a bell crank KK urged clockwise by a spring L'', and is provided with a pin adapted to engage the edge or top of a piece of insulating material on the bell crank K' which as shown in Fig. 1 is spaced from the corresponding locking bar, and therefore not in electrical connection with the bar.

The armature F'' of the operating relay XIA1 is connected by links to bell cranks KK', the free ends of which carry a bail O' extending across all of the bell cranks KK. Energization of the relay XIA1, lowers the bail O' and lifts the pins on the bell cranks KK out of engagement with the bell cranks K', permitting the bell cranks K' to close the contacts U', V', in case the relay IIIA5 is energized and attracts its armatures F'' outwardly. This movement of the armature F'' opens circuits at H'', I''.

If a bar M1—M5 which was moved to the left is now moved toward the right, the pin on the associated bell crank KK will engage the edge of the piece of insulating material on the bell crank K' and open associated contacts U', V', while the pins on the other bell cranks KK will rest on top of the pieces of insulating material on the bell cranks K', thus permitting the associated contacts U', V', to remain closed.

If it is assumed that the operating relay 1A7 was operated as the digit relay 7A4 was energized, and that the tabulating relay IIIA5 is normal, i. e., all the U', V', contacts are closed and all the H'', I'', contacts are open, then after the numeral key has been released and the locking bar has been restored, the spring armature F'' of relay 7A4 will be in the position indicated and a circuit is prepared over the locking bar M1 and the bell crank K and contacts U, V of the relay 7A4 under the locking bar M1. In the relay IIIA5, the corresponding contacts U', V', are open, while the corresponding contacts H'', I'', are closed. The contacts U', V', of the bell cranks K' associated with the other locking bars are closed while the contacts H'', I'', are open.

As will appear later, the locking bars M1—M5 are operated in succession. After an operation of the bar M2, a U, V, contact and the contact H'', I'', associated with this bar will be closed while the associated contacts U', V', will be open. All of the other U', V', contacts are closed while all of the other H'', I'', contacts are open. The operated contacts U, V, under the first and second locking bars will be held closed by their bell cranks K. The free contacts H, I, of the relays 0A4 to 9A4 are closed only so long as these relays are energized.

The upper ends of the armatures F' are beveled to cooperate with beveled portions on the associated bell cranks K, whereby the distance of movement of the armatures may be shortened. The bell cranks K associated with the locking bars M1—M5 are prevented from being accidentally lifted when the bars are at rest, by the adjustable blocks P', Fig. 2, on the bars M1—M5. The lower portion of each block is provided with a saw cut providing a bell crank engaging portion which may be bent up or down for purposes of adjustment. The spring L' is preferably anchored to this block.

*Secondary register*

As shown in Figs. 3, 4 and 17, the secondary register includes three relays A5 designated XIA5, XIIA5, and XIIIA5. The relays XIA5 and XIIA5 are controlled by the same operating relay XIVA1, the bails O' for these relays being rocked in unison by a linkage connection Q as shown. The relay XIIIA5 is similar in construction to that of relays XIA5 and XIIA5, but its bell cranks K' are operated by the associated locking bars M1—M5 with which they are in electrical contact to prepare circuits through the locking bars to the locked contacts in the digit storing relays 0A4—9A4.

This register also includes a relay XXVIA6 (see Fig. 7) in which a circuit is prepared over bell crank K and contacts U, V. This relay, as will appear later, is energized whenever a transfer or carry is necessary, and the bell crank K is lifted to permit the armature F' to be moved outwardly to in turn permit the bell crank to close contacts U, V, by an insulated pin on an arm R secured to and insulated from a shaft S. The shaft S carries arms T insulated therefrom, which are connected by a bail T' faced with insulating material and extending across the ends of the locking bars M1—M5 to be operated thereby whenever an amount is entered in any position in the secondary register. If the result of addition or subtraction necessitates a transfer or carry operation, the relay XXVIA6 will be energized to move the armature F' into position to permit closing of the contacts U, V, as the locking bar returns. These contacts will be held closed by the spring L until another digit of a result including the unit of transfer is being entered under the next higher locking bar M1—M5.

*Reversing mechanism*

A wiring diagram of the reversing mechanism is shown in Fig. 14, while the mechanical features of this reversing mechanism are shown in Figs. 9, 10 and 11.

Each of the reversing drums X and Y, Fig. 9, comprises a ratchet $a$, which carries a ring $b$, Figs. 10 and 11, of insulating material. Each ring is provided with five contacts $c$ to which leads are connected (Fig. 14), and which are adapted to be engaged by spring armature contacts $d$ on a fixed ring $e$ of insulating material. As shown in Fig. 14 there are nine spring contacts $d$ to which leads are connected. Secured to the ring $e$ is a drum relay comprising a coil B'', a cover C'' and a core D'' secured to the cover C'' as shown. The ratchet $a$ is secured to a shaft $g$ rotatable in bearings in the core D'' and is urged into home position by a spring $h'$ suitably anchored to the core and shaft. Suitable energizing leads are provided for this relay.

The operating means for the drums is shown in Fig. 9. Each drum is provided with a spring pressed actuating pawl $h$, and a spring pressed retaining pawl $i$. The pawls $h$ are reciprocated laterally by bell cranks $j$, operated by a rod $k$ connected to an armature $k'$ of an operating relay BB. The pairs of pawls $h$, $i$, are thrown into and out of engagement with their respective ratchets $a$ by a rocking lever $m$ operated in one direction by a link $n$ connected to the armature $o$ of a relay MM and in the other direction by a spring $p$. The pawls $h$, $i$, are in position to operate the ratchet $a$ of the X drum, in which position they are held by the spring $p$. Upon energization of the relay MM, the pawls $h$, $i$, associated with the drum X will be lifted, and the pawls h, i, associated with the Y drum will be lowered. The next energization of relay BB will therefore operate the drum Y.

In Fig. 14 the drum Y is shown in home position, while the drum X is shown in the position it assumes when a number having four digits has been entered in the primary register. That is, the contacts c have been shifted four steps to the left around the contacts d. The digits of numbers are indexed on the keyboard from highest to lowest denominational order, and the entry of the first number in the primary register takes place from MI to M5 (right to left in Fig. 15), the highest digit being entered under bar MI, and so on. By the aid of the reversing drum X this number is transferred to the secondary register in the reverse order, that is, from M5 to MI (left to right in Fig. 15). It is accordingly received by the secondary register units digit first, and is entered therein from MI to M5 (right to left in Fig. 17).

Since this number is being transferred from the primary register from left to right, an immediate entry of a second number in the primary register is possible if it is entered in this same direction. The provision of the reversing drums makes this possible, the highest order digit being entered first (under bar M5) and so on. This time the reversing drum Y is shifted, and makes it possible to transfer the number to the secondary register in the reverse order, that is, from MI to M5 (right to left in Fig. 15). This number, like the first, is entered in the secondary register, units digit first, from MI to M5 (right to left in Fig. 17), after it has been added to the amount already entered in the secondary register.

Keyboard

Each of the digit keys q (Fig. 14) closes contacts q' and q" (Fig. 13) which connect the battery to the coil of the corresponding digit storing relay 0A4 to 9A4 in the primary register as will appear from the diagram in Figs. 14 and 15. The clearing key TR closes a pair of similar contacts to connect battery to the clearing relay XXXIA3 (Fig. 19).

The typing and adding key TT, the subtraction key SU, and the total printing key RR in Fig. 14 for printing the amounts in the secondary register, are all of the same construction. The TT key shown in Fig. 12 as well as the other keys, SU and RR, upon depression, opens the energizing circuit of relay VV at WW, thus deenergizing relay VV which permits the spring XX to move the common locking arm SS for these keys into the path of the projection YY on a block on the stem of the key TT. Normally the locking arm is held in the position shown by the core UU of the energized relay VV. The switch WW is constructed to deenergize the relay VV after the projection has been moved into the dotted position. This movement of the key also closes switches ZX and ZY and later the switch ZZ. Upon return movement of the key, the switch ZZ is opened first, and later, after energization of the relay VV which withdraws the locking arm SS, the switches ZY and ZX are opened and the switch WW is closed. These switches connect the battery to certain leads later referred to. The keys q, TR, SU, TT and RR are returned by springs YX as shown.

Printing mechanism

This mechanism is indicated diagrammatically in Fig. 18 which shows a platen, one type bar, one operating relay and the connections between the armature VA of the relay and the type bar. This printing mechanism may be controlled to print from right to left or left to right as shown in Patent No. 1,876,296. The circuit connections for the operating relays VW, of which there is one for each digit, will be described later.

Entry of amounts in the primary register

As one of the digit keys q, Fig. 14, is depressed it connects the plus from the battery to a lead corresponding to the number on the key. These leads are indicated at 0 to 9, Figs. 14 and 15, and are the energizing leads for the digit storing relays 0A4—9A4 of the primary register. As the relay corresponding to the depressed key picks up it closes its free contacts H, I, thus connecting plus from the battery to the line IIa which is connected across the normally closed contacts H', I', of relay IIA3 with line IIb which extends across normal make and break contacts H', I', of relay IVA3 to line IIc connected across the hook contacts U', V', of the tabulating relay IIIA5 to line IId which is the energizing lead for the operating relay IA7. In the normal position of the relay IIIA5 all the contacts U', V', are closed and the contacts H", I", are open.

Energization of the relay IA7, as shown in Fig. 1, moves the locking bar MI downwardly in Fig. 15, and to the left in Fig. 2, thus permitting the armature F' under the locking bar MI, of the energized relay 0A4 to 9A4, to move outwardly whereby the contact U may move into engagement with contact V as the bar MI is restored.

Energization of the relay IA7 also connects plus over contacts s, t, (see also Fig. 8) with line IIe which is the energizing lead for relay IVA2. The line IIa is also connected by a line IIf to the spring contacts in relay IVA2. As these contacts are now closed one of these contacts provides a holding circuit for the relay IVA2 so that this relay will remain energized as long as the line IIa is connected to the battery, that is, as long as the numeral key is held depressed. The line IIf is also connected across the IVA2 to the line IIg which is the energizing lead for the relay IIA3. As this relay picks up it breaks the connection between the lines IIa and IIb, deenergizing relay IA7.

In the relay IVA2 the line IIf is also connected to the line IIh which, in Fig. 14, is shown as the energizing lead for the ratchet operating relay EB. As the relay BB is operated, see Fig. 9, it moves the drum X ahead one step.

As the bar MI is moved to the left, in Fig. 2, it carries the bell crank KK with it and the spring L" rocks the bell crank KK into the position shown in Fig. 2. As the bar MI is restored to the right, Fig. 2, it carries the bell crank KK to the right and rocks the bell crank K' clockwise thus permitting the armature F' to move toward the core D closing the contacts H", I", corresponding to the first locking bar MI. The rocking movement of the bell crank K' breaks the connection between the lines IIc and IId, Fig. 15, at the contacts U', V', thus preventing an energization of the operating relay IA7 when the line IIa is again connected to the battery. The first digit of the number is now entered under the locking bar MI of the primary register.

When the next digit key, Fig. 14, is depressed it energizes its corresponding storing relay 0A4 to 9A4 in Fig. 15 which connects the positive line to the line IIa which, as before described, is extended across the closed contacts in relay IIA3 to line 11b. As the first pair of contacts U', V', in relay IIIA5 are broken, connection will not be made with the line 11b as in the case when the first digit was entered. The line 11b is now connected over the closed contacts H", I", under the first locking bar with line 11i which is connected under a normal make and break contact in relay IVA3 with line 11k connected over the contacts U', V', of relay IIIA5 under the second locking bar M2 with line 11l which is the energizing lead for the operating relay 2A7.

This relay operates the locking bar M2 which permits the spring armature F' associated with this bar to be moved outwardly by the energized relay A4 so as to permit the bell crank K to close contacts U and V after the bar M2 is restored to the right, Fig. 2. The circuit connections operating the relay BB, Fig. 14, are made as in the case when the first digit was entered. The movement of the bar M2 to the left, and then to right, causes the contacts U', V', under the bar M2 in relay IIIA5 to be opened and the contacts H", I", to be closed as in the case of the operation of the bar M1, as described.

When the next digit is entered the line 11a, Fig. 15, will be connected across the second contacts H", I", of relay IIIA5 under bar M2 and over a closed contact in relay IVA3 and closed contacts U', V', of relay IIIA5 corresponding to the locking bar M3 with the energizing lead for the operating relay 3A7. The energization of the relay 3A7 operates the locking bar M3 so that the contacts U, V, under this bar in the relay 0A4 to 9A4 corresponding to the numeral key depressed will be closed.

In the machine disclosed provision is made for entering numbers having five denominational digits. The next digit will be entered under the locking bar M4 and the succeeding digit under the locking bar M5. If we assume that the number entered has four digits, the drum X, Fig. 14, will have been shifted into the position indicated in this figure.

*Transmitting from the primary register to the secondary register*

After having introduced the first number in the way stated above, by depressing the key TT the operation will be as follows:

It will be seen in Fig. 14 that relay IXA2 is under current, the circuit being closed from the plus line over a breaking contact in relay XXXIA3, Fig. 19, and 31a over a breaking contact in relay VIIA3, line 13a, breaking contact in relay VIIIA3 to line 13b, through the coil of relay IXA2 to the minus line.

By depression of the key TT, Fig. 12, the contact WW is opened disconnecting the energizing lead 12a of relay VV from the plus side of the battery. As the relay VV deenergizes it permits the locking member SS to move toward the key TT in back of the projection YY on the key to hold this key depressed, the locking member SS moving under similar projections on keys SU and RR to prevent depression of these latter keys.

Upon further depression of the key TT the contact ZX, Fig. 12, is closed connecting plus with a lead 14a which, as shown in Fig. 14, is connected over an operated contact in relay IXA2 with the line 14b which is the energizing lead for the relay XA3. The lead 14a is also connected with the lead 14b over an operated contact in relay XA3 after this relay is energized. This relay will be under current as long as the contact ZX is held closed by means of the key TT.

The same relay also connects the lead 15a which is connected with the battery over a breaking contact in relay VIIA3, with the lead 15b which is the energizing lead for relay VIIIA3. As this relay is energized it breaks the connection 13a and 13b and consequently the relay IXA2 will be deenergized. The relay VIIIA3 connects battery over one of its operated make contacts with line 16a which is the energizing lead for relay MM. The energization of this relay has the effect, as previously described and as shown in Fig. 9, of raising the one pair of pawls h, i, out of engagement with the ratchet a associated with the drum X, and of lowering the other pair of pawls h, i, into engagement with the ratchet a associated with the drum Y.

The energization of the relay XA3 connected battery over a make contact with lead 17a which is the energizing lead for the coil of the drum X. As the coil of the drum X is energized it moves its spring contacts d into engagement with the contacts c on the ring b thus preventing a return of the drum X even though the pawls h and i are disengaged from the ratchet a. The drum X will be held in adjusted position as long as the relay XA3 remains energized.

Relay VIIIA3 further connects the plus from the battery over an operated make contact with the lead 18a which, as shown in Fig. 15, is the energizing lead for relay IVA3 which consequently is kept energized as long as the relay VIIIA3 is under current.

The contact ZZ, Fig. 12, which is not closed until the key TT is totally depressed, connects the plus lead from the battery with lead 19a which as shown in Fig. 15 is the energizing lead for the tabulating relay IIIA5 and the operating relay XIA1. The energizing of these two relays as previously described has the effect of bringing the tabulating relay IIIA5 to its normal position in which all of the contacts U', V' are closed and all of the contacts H", I" are open.

The lead 19a, Fig. 17, is also connected with the energizing leads for the three tabulating relays XIA5, XIIA5 and XIIIA5, as well as the operating relay XIVA1. The operating relay XIVA1 operates in connection with the tabulating relays XIA5 and XIIA5. In Fig. 17, the operating relay XIVA1, is for convenience, placed next to the denominational operating relays. The relay XIIIA5 upon energization breaks all circuits prepared over its contacts. The armature F' prevents the contacts U', V' from being closed before the relay is deenergized, see Fig. 4.

After the operator removes pressure from the key TT all of the mentioned relays controlled by the contact ZZ will be deenergized while the locking member SS prevents complete return of the key TT thereby holding the contact ZX closed. After the key TT has been returned to this position the machine is immediately ready for the introduction of the next number, all hook contacts of the tabulating relays of both registers being closed.

As the relay IVA3 in Fig. 15 is now under current, a digit storing relay of the primary register, will now close the circuit 11a, 11b to 11m. This circuit will be connected with 11n over the hook contacts U', V', in the tabulating relay IIIA5 so that the denominational operating relay 5A7 will now be energized, thus permitting contacts U, V, under the locking bar M5 of the energized relay A4 to be closed. At the same time the contacts U', V', under bar M5 will be opened while contacts H'', I'', will be closed. When the next digit is entered, contacts U, V, and H'', I'', under bar M4 will be closed and contacts U', V', will be opened and so on for other digits.

The first number entered on the primary register, Fig. 15, was entered from the outside right hand locking bar towards the left. The energization of the relay IVA3 has shifted the circuits so that when the second number is entered by depressing numeral keys the digits of this number will be entered under the locking bars from left to right.

Simultaneously with the introduction of the second number into the primary register, Fig. 15, by means of the digit keys 1—0, key TT is held depressed by the locking detent SS so that the contact ZY, as well as the contact ZX, will remain closed. The contact ZY connects the plus lead from the battery with a lead 20a. Beside the first mentioned number, the introduction of which into the primary register has been described, it is supposed that a locking contact has been closed under each of the locking bars of the secondary register (for the sake of simplicity this can be supposed to have been done by hand). The lead 20a which through the key TT is connected to the battery, as shown in Fig. 12, leads the current to the first hook contacts U', V', in each of the tabulating relays XIA5, and XIIIA5, as well as to the contacts I'' of these relays. The lead to the contacts I'' in relay XIIIA5 is however closed over a break contact in relay XXA3. Over the first hook contact in tabulating relay XIA5 the lead 20a is connected with the lead 20b1 which is directly connected with the first movable contact in the drum X, Fig. 14. As this drum has been shifted as many steps as the number of digits in the number that is first introduced into the primary register, and as the drum X, as mentioned, is now under current, the first contact of the drum, to which lead 20b1 is connected, is now in contact with one of the leads 20c, 20d, 20e, 20f and 20g, which are connected with the locking bars of the primary register, Fig. 15, so that the lead 20a is now connected with the locking bar under which the last or unit digit of the number entered in the primary register is registered, and over the closed contact under this bar. The respective lead from this closed contact is connected with one of the leads 21a to 21j which correspond to the numerical value of the units digit of the number in the primary register.

The circuits 21a to 21j are carried over the unenergized switching relay XVA3, Fig. 16, to the leads 21k to 21t which are the energizing leads for the relays 0A2 to 9A2 of the computing mechanism shown in Fig. 16. That means that the addition relay 0A2—9A2 of the computing mechanism corresponding to the numerical value of the units digit of the first number entered in the primary register has been energized.

The lead 20a, Fig. 17, is further connected over the first closed hook contacts U', V', in the tabulating relay XIIIA5 and over the hook K' to the locking bar MI (Fig. 4), situated over these first contacts, the connection being represented in Fig. 17 by a lead 22a, then over the contacts U, V, closed under this locking bar, with one of the leads 23a to 23j, and over the normally closed contacts of the switching relay XVIIA3, Fig. 16, with leads 23k to 23t which are connected to all the spring armatures in the relays 0A2 to 9A2 of the computing mechanism.

One of these relays, 0A2 to 9A2, as previously described, and which corresponds to the units digit of the number registered in the primary register, is energized. The mentioned circuits are connected to the circuits 24a to 24j which are extended over the closed contacts in relay XVIIIA3 to the lines 24k to 24t, which as shown in Fig. 17 are the energizing leads for the storing relays 0A4 to 9A4 of the secondary register. In this way the circuit is closed from the battery to lead 20a over the tabulating relay XIIIA5, lead 22a, over the closed hook contacts U, V, under the first locking bar of the secondary register, over the switching relay XVIIA3, computing relays 0A2 to 9A2, and relay XVIIIA3, energizing the locking relay of the secondary register, the numerical value of which represents the units of the sum of the units digit in the primary register and the units digit stored under the locking bar MI in the secondary register.

The denominational operating relays 1A7 to 5A7 of the secondary register which operate their respective locking bars are controlled by means of the tabulating relay XIIA5 in the same way in which the denominational operating relays in the primary register were controlled by the tabulating relay IIIA5, Fig. 15. A relay for reversing the order of the movement of the locking bars in the secondary register is not necessary as the units of the computed result are always entered under the first locking bar MI.

As shown in Fig. 17, the lead 25a is connected over a normal break contact in relay XXA3 with the lead 32a. When any addition relay is energized, plus will be connected from the battery to line 26c which is the holding circuit for the storing relays in the secondary register. At the same time the energized storing relay connects line 26c to line 32a which over the break contact in the relay XXA3 is connected to line 25a. This line continues over the contacts in relay XIIA5 to one of the leads of the denominational operating relays 1A7 to 5A7 which when energized operates its associated locking bar. Lead 25a is connected to the lead 25b over the first hook contact in the tabulating relay XIIA5 which is the energizing lead for the denominational operating relay 1A7, namely, for the one which operates the first locking bar of the secondary register. The operating relay connects the lead from plus with the lead 26a which is the energizing lead for the relay XXIIA2.

In this relay the lead 26a is connected with lead 26b which is the energizing lead for relay XXA3. In the relay XXIIA2 lead 26a is also connected with lead 26c which acts as a holding circuit for relays XXIIA2 and XXA3 as well as for the storing relays.

The relay XXA3 disconnects the lead 20a from the contacts I'' of relay XIIIA5 and the lead 25a from the lead 32a opening the circuit for the denominational relay 1A7 of the secondary register and permitting the locking bar MI which was moved by the relay 1A7 to fall back. The return movement of the locking bar opens contacts U', V', under the bar MI in relay XIA5, which causes deenergization of the addition relay whereby line 26c will be disconnected from plus with the effect that the energized relay 0A4—9A4 as well as the relays XXIIA2 and XXA3 will be deenergized. As relay XXA3 deenergizes, it connects lead 25a to lead 32a. As the operating relay 1A7 deenergized, the circuit 26a was disconnected from the battery over contacts s and t.

As all the first hook contacts of all the tabulating relays of the secondary register are broken, the first spring contacts of these relays are closed, and the next circuits from lead 20a, which is still connected with plus by means of the key TT, will extend over the second hook contacts of tabulating relays XIA5 and XIIIA5. The following then takes place: In relay XIA5 line 20a is extended to line 20b2 and over the reversing drum X to the locking bar in the primary register which corresponds to the numerical value of the tens digit of the number which was first introduced in the primary register, and over the closed contact under this bar to the addition relay which corresponds to the numerical value of the above mentioned tens digit. In the tabulating relay XIIIA5, line 20a is connected to the second locking bar in the secondary register, whereafter the storing relay in the secondary register corresponding to the value of the sum of the tens digit in the primary and secondary registers will be energized. The line 32a is again connected over the energized storing and addition relays to plus. The operating relay 2A7 that moves the second locking bar M2 of the secondary register is energized by the circuit from line 25a over relay XIIA5 and the second locking bar is moved forward and then returned by the closed circuit over the s and t contacts, which energizes the relay XXA3 breaking the energizing circuit to relay 2A7 by interrupting line 25a from 32a. This permits the closing engagement of the corresponding contacts U, V, under the second locking bar and will shift the circuit connections in the tabulating relays XIA5, XIIA5, XIIIA5 to the next denominational order as in the case when the sum of the units in the primary and secondary registers was entered in the secondary register. After the sum of tens digits has been registered, automatic addition of the hundreds digits will take place in the same manner.

*Transfer mechanism*

If, under the transmission, an addition of two members takes place the sum of which is higher than 9 it is necessary that the subsequent sum be increased by one unit. For this purpose the incoming lines 23k to 23t, Fig. 16, are connected to a set of transfer leads 24a' to 24i' across the energized addition relays 1A2 to 9A2. The leads 24a' to 24i' are the energization leads for their respective tens transfer relays XXVA2. The numerals 10 to 18 on these relays indicate that the one bearing the numeral ten is energized when the sum is ten, the one bearing the numeral 11 when the sum is eleven, and so on.

Upon energization of any one of these transfer relays a circuit is closed from battery plus to a lead 27a which, as shown on Fig. 17, is the energizing lead for the transfer controlling relay XXVIA6.

As shown in Figs. 3, 4 and 7, the make contact of this relay is closed and locked if the relay XXVIA6 is energized at the time that any one of the locking bars is moved forward and returned. As the hook K for this relay, Fig. 7, is lifted by a locking bar the spring armature F' may move outwardly to permit the hook K to drop down when the locking bar returns to normal position. This closes the contacts U, V, which connect the plus line with the lead 28a, Fig. 17, which is the energizing lead for the transfer switching relay XVA3 of Fig. 16.

Energization of this relay connects the lines 21a to 21j to the lines 21k to 21t in such a manner that all the digit lines 21a to 21j are connected to a digit line 21k to 21t the numerical value of which is one unit higher than the one which would have energized the relay 0A2 to 9A2 if relay XVA3 had not been energized. If the digit transmitted from the primary register is nine when a carry is necessary, line 21j will be connected to line a' which connects in relay 0A2 to line a" which is the energizing lead for relay bearing the number 9 which, as shown, closes a circuit to transfer relay XXVIA6, Fig. 17. This causes a unit to be added to the next digit transmitted as before.

After the number stored under the last locking bar in the primary register has been transmitted to the secondary register, that is, after the numerical value of the digit of highest denominational value of the number introduced in the primary register has been transmitted, the circuit will be closed from the tabulating relay XIA5, Fig. 17, in the secondary register over one of the lines 20b1 to 20b5 and over the drum X of the tabulating device to a lead 29a which is the energizing lead for the relay XXVIIA2, Fig. 14. This relay connects the battery with lead 12a which is the energizing lead for relay VV, Fig. 12. This relay, Fig. 12, releases, as mentioned above, the key TT. Release of the key TT disconnects the battery from the lead 20a by opening the switch ZY, Fig. 14, whereby also the circuits over the tabulating relays XIA5, and XIIIA5 will be interrupted. This will cause the deenergization of relay XXVIIA2. The relay VV, Fig. 12, is however still energized by means of the contact set WW which now is closed.

Contact set ZX also is interrupted by the release of key TT with the result that the relay XA3, Fig. 14, will be deenergized as lead 14a, Fig. 12, is interrupted from the battery at the contact ZX, interrupting the holding circuit 14b.

The relay VIIIA3 is, however, still under current, the circuit being closed from plus of the battery to a lead 30a over a breaking contact in relay VIIA3 as well as over the self-closing contact in relay VIIIA3.

As the relay XA3 is deenergized the circuit to lead 17a over the coil af the drum X will be interrupted. The coil of this drum will be deenergized and the drum will be returned to its original position by means of the spring h'.

If the drum Y of the reversing mechanism is shifted any number of steps, that is, when the next succeeding number has been introduced into the primary register at the time the transmission of the previous number was being made, the key TT can again be depressed immediately after it has been released. The contact set WW will then interrupt the lead 12a so that the relay VV, as mentioned above, will be deenergized. The lead 19a will, as previously described, again close all the tabulator hook contacts, and lead 14a will again be connected with the battery but as relay IXA2 and XA3 are deenergized, the lead 14a will be connected with lead 14c over the breaking contact in relay XA3 whereby relay VIIA3 is energized. As lead 30a is hereby disconnected from the battery, relay VIIIA3 will be deenergized. Relay VIIA3 connects battery with lead 31a which is the energizing lead for the drum Y of the tabulating mechanism. Relay VIIIA3 also disconnects the leads 16a and 18a from the battery so that the relay MM and relay IVA3, Fig. 15, are deenergized.

If it is desired to introduce a new number again into the primary register, the drum X of the tabulating mechanism will again be shifted a corresponding number of steps, the circuits closing as above described by transmission of the number already introduced in the primary register to the secondary register taking place over the drum Y of the reversing mechanism which, as stated above, is energized. This transmission will take place until the lead 29a is connected with the battery over the tabulating relay XIA5 in the same way as described, over drum Y of the reversing mechanism. Hereby the relay XXVIIA2 will be energized and the relay VV also energized so that the key TT again is released. When the lead 14a is interrupted by means of the contact ZX relay VIIA3 will be deenergized. This will connect plus over break contact in relay VIIA3 with line 13a connected over normal break contact in relay VIIIA3 with line 13b which is the energizing lead for the relay IXA2. The relay IXA2 picks up and the condition of the relays, shown in Fig. 14, is the same as it was when the first number was transferred from the primary register to the secondary register.

As shown in Figs. 9, 10, 11 and 14 the cores D'' are provided with nine contacts d that may be connected to the line 20a. In actual practice the primary register will have as many bars M as the number of digits of the highest number it may be desired to enter into the registers.

As transmission over the bars of the primary register is discontinued, it may be necessary in the case where carrying or borrowing is necessary to continue the transmission over the bars of the secondary register without releasing the key TT or SU. The line 29a, Fig. 14, is therefore extended over the transfer controlling relay XXVIA6, Fig. 17. The incoming lead 29a is connected to the spring armature F' which in normal position is in contact with the contact I'' to which the outgoing lead 29a is connected.

After transmission over the primary register has ceased the contacts F' and I'' will be closed and the key TT or SU released unless, the hook contacts U, V, were closed as the lead 28a was closed over the other contacts U, V, as required for carrying or borrowing. In that event, as the spring armature F' is connected to the hook E, the line 29a will be extended over contacts U, V, to line 29b which, in Fig. 16, is connected to the zero line 21a which, when relay XVA3 is energized, is connected to the lead of the adding relay 1A2.

In this event, transmission over the secondary register will continue and transfers will be added as required until the relay XVA3 is deenergized. The transmission then ceases as the key TT or SU is released and the relay 1A2 is not again energized. The digits under the higher locking bars in the secondary register will remain stored under these bars, as transmission over these bars, after transmission over the bars of the primary register has ceased, is necessary only for purposes of borrowing or carrying.

If an attempt is made to introduce a number that exceeds the capacity of the primary register, that is, for instance, in this case a six digit number, the spring contact in the outermost position of the tabulating relay IIIA5, Fig. 15, may be either on the right hand side or the left hand side of this relay and will connect line 11b respectively with lead 11i or 11p over relay IVA3 to a lead 11o whereby a lamp La in the keyboard, Fig. 14, will give a signal. The lead 11o is also connected to the lead 12a thus causing energization of relay VV and release of the depressed key TT.

The same lamp can also be made to signal if the number transferred from the primary register to the secondary register uses the full capacity of the registers as lead 20a will then be connected to lead 11o in relay XIIIA5 and thus by the lamp La warn that the capacity of the machine has been reached. The current over lead 11o again causes the key TT to release.

*Subtraction*

By energization of relays XVIIA3 and XVIIIA3, Fig. 16, the leads 23k to 23t and 24a to 24j which are respectively incoming and outgoing leads for the contacts in the calculating relays 0A2 to 9A2, will change place, and the circuits consequently will be closed in the opposite direction over these relays. The numerical values represented by the leads which in the first case would be increased with a number of units corresponding to the numerical value of the energized relay 0A2 to 9A2 will in the last case be reduced by the same number of units. If, now, a number is transmitted from the primary register to the secondary register through the addition device, the relays XVIIA3 and XVIIIA3 will cause the number transmitted to be subtracted from the number in the secondary register as is apparent by following the circuits in Fig. 16.

Subtraction is performed by depressing the subtraction key SU, Fig. 14, which, in addition to closing all the contacts closed by the key TT, also connects battery with the lead 33a, Fig. 14 which is the energizing lead for relays XVIIA3 and XVIIIA3, Fig. 16. The key SU, the construction of which is the same as that of key TT, holds the contact connecting battery to lead 33a closed as long as the key is depressed and held depressed by the locking detent SS which, as stated above, is common to all the keys SU, TT and RR. The same circuits which are closed by means of the key TT to transmit a number from the primary register to the secondary register are also closed by the subtraction key SU.

*Printing mechanism*

As the number is transmitted from the primary register to the secondary register it may be simultaneously printed by means of the typewriter as shown diagrammatically in Fig. 18. The printing mechanism includes ten type bars Tt only one of which is shown in Fig. 18. Each of these type bars may be operated by an armature VA of its respective operating magnet VW only one of which is shown. Each of the ten magnets VW may be connected in the circuit 21a to 21j, Figs. 15 and 16. These circuits, as it will be recalled, are the energizing leads for the relays 0A2 to 9A2 in the addition device. The impulses to these relays will simultaneously act upon the magnets VW of the typewriter so that the numerical value corresponding to the digits transmitted will be printed by the type bars Tt, as shown in Fig. 18. The leads 21a' to 21j' for controlling the printing may be connected to the leads 21a to 21j, as indicated in Fig. 15. The leads 21a' to 21j' are carried over the normal make and break contacts of the switching relay XXIXA3 directly to their respective type magnets VW whereby the circuits consecutively closed over the contacts of the primary register will energize the printing magnets VW so that the numerical value of the contacts corresponding to the number previously introduced by means of the keys will be recorded in print by means of the type bars T*t* as the number is being transmitted from the primary register.

Printing totals on the secondary register

If it is desired to print the result registered in the secondary register, Fig. 17, the key RR will be depressed, which will close contacts corresponding to those described for the key TT, except that the contacts ZX will connect battery with a lead 34*a* instead of 14*a* which controls energization of the reversing drums. This lead 34*a* is the energizing lead for relay XXIXA3, Fig. 18. Energization of the relay XXIXA3 connects the printing magnets VW with leads 24*k''* to 24*t''* which are connected to the corresponding leads 24*k* to 24*t*, Fig. 17, which are the energizing leads for the storing relays of the secondary register. Lead 34*a* is also the energizing lead for relay XXXA2. The leads 20*b*1, 20*b*2, 20*b*3, 20*b*4 and 20*b*5 from the tabulating relay XIA5, Fig. 17, of the secondary register are shown in Fig. 18 connected through make contacts of relay XXXA2 with a lead 35*a* which is directly connected with lead 21*k*, Fig. 16, which is the energizing lead for the 0A2 relay of the addition device.

The key RR which, as mentioned above, has the same contacts ZZ and ZY as the key TT, Fig. 12, will respectively energize the tabulating relays XIA5, XIIA5 and XIIIA5 in Fig. 17, and establish circuits as before over the contacts of relays XIA5 and XIIA5 as under ordinary transmission of the number. The relay XXXA2 has, however, connected the circuits 20*b*1 to 20*b*5 from relay XIA5, Fig. 17, to line 21*k* which extens to the addition relay 0A2. The circuits from tabulating relay XIIIA5 will consequently pass over this relay 0A2 where their numerical value will be unchanged so that the numerical value of the number which is registered under the locking bars of the secondary register will again be introduced unchanged at the movement of the locking bars, the circuits for numerical values corresponding to the locking bars energizing the locking relays corresponding to the same numerical values. Nothing, therefore, is changed in the secondary register by such a transmission but the printing magnets have received the desired impulses and cause the number in the secondary register to be printed. The key RR will be released by the connecting of 1 *l*o to 20*a* in relay XIIIA5 as described.

Clearing the secondary register

After the amount in the secondary register has been printed this register can be cleared by pressing the key TR, Fig. 14, which is of the same type as the digit key in Fig. 13. The depression of the key TR connects battery to a lead 36*a* which is the energizing lead for the relay XXXIA3, Fig. 19. This relay closes the lead 25*a* which over the relay XXA3, Fig. 17, is connected to the lead 32*a*, with the leads 25*b*1 to 25*b*5 which are the energizing leads for the denominational operating relays 1A7 to 5A7, Fig. 17, of the secondary register by means of which all the locking bars of the secondary register will be reciprocated simultaneously. Furthermore, the relay XXXIA3, Fig. 19, connects the lead 36*a* with lead 24*k'''* which is the energizing lead for the relay 0A4 in the secondary register, the numerical value of which corresponds to 0. This relay will consequently be energized as the locking bars are moved so that all the hook contacts for this relay will be closed. When the key TR is again released the circuit to the relay XXXIA3 will be broken and consequently also the circuit to the relay 0A4 in the secondary register. The secondary register is now cleared, that is, zeros are registered on all the locking bars. As the plus lead is disconnected from line 31*a*, the reversing drum mechanism is normalized, Fig. 14. As the plus is connected over relay XXXIA3 to lead 19*a*, the tabulating relays of both registers are normalized and the machine is ready to receive and compute other numbers.

Operation of the tabulating relays

The tabulating relay IIIA5, Figs. 2 and 15, and the tabulating relays XIA5 and XIIA5, Figs. 4 and 17, when energized over the lead 19*a*, normalize immediately upon energization of their respective operating relays XIA1 and XIVA1. Circuits are prepared immediately over the first contacts U', V'. In the case of the relay IIIA5 the circuits over these contacts are made from right to left and left to right under control of the relay IVA3. In the case of the relay XIA5 the circuit is extended to one of the reversing drums and over the primary register to an adding relay. The circuit over the contacts in relay XIIIA5 from line 20*a* is delayed until this relay is deenergized by the initial return movement of the controlling key. The circuit is then extended over the digit lines in the adding relays to a storing relay in the secondary register. The energization of the adding relay connected plus to line 26*c* and energization of the storing relay in the secondary register extends this circuit to line 25*a* which extends over contacts U', V', of relay XIIA5 to the lead of one of the operating relays 1A7 to 5A7.

Operation

In adding and subtracting numbers, the operation is performed by indexing the first number on the keyboard and entering it in the primary register, then transmitting it from the primary register through the computing mechanism to the secondary register under control of the key TT. After the second number has been entered in the primary register it is transmitted to the secondary register under control of the key TT for addition and under the key SU for subtraction. The numbers are printed as they are transmitted.

The result of the computation registered in the secondary register may be printed without clearing the register by pressing the key RR. By this means a sub-total or running total may be obtained at any time.

The secondary register may be cleared to receive the sum or difference of another series of numbers by pressing the key TR which causes the result registered on the secondary register to be cleared out and zeros to be entered in the secondary register.

If the machine has been idle for any length of time and the operator is not sure that the machine is clear, it is advisable, before entering any numbers, to clear the secondary register by pressing the key TR which causes entry of zeros in all the denominational orders of the secondary register. The primary register is not cleared but all the tabulating relays as well as the reversing drum which was shifted during the entry of the number last set up will be normalized. The primary register is cleared of previous numbers only as other digits are entered in the denominational orders in which these previous numbers were registered.

Addition

The machine is ready to receive and add a series of numbers whenever the tabulating relays IIIA5 in the primary register, and the tabulating relays XIA5, XIIA5 and XIIIA5 in the secondary register have been normalized.

In adding the number 194 to the number 246 the following operation takes place:

*Entry of the first number in the primary register*

The digits of the number 246 are indexed on the keyboard in rapid succession. The drum X will be shifted as this number is entered.

Depression of the key 2, Fig. 14, connects plus from the battery to the "two" digit line which is the energizing lead for relay 2A4, Fig. 15. This relay picks up and connects plus to line 11a which extends across the normal break contact in relay IIA3 to line 11b, connected over a normal make and break contact in relay IVA3 to line 11c which is connected across the right hand hook contacts U', V', of relay IIIA5, to the energizing lead 11d for the locking bar operating relay IA7 which picks up and moves the locking bar M1, Fig. 2, to the left, thus raising all of the hooks K to permit the armature F' of the energized relay 2A4 to move outwardly.

This movement of the bar M1 also moves the hook KK carried by this bar to the left, Fig. 2, to let its pin drop behind the hook K'.

The relay IA7 also closes a circuit which energizes relay IVA2 which connects line 11a to line 11h which is the energizing lead for the drum operating magnet BB, Fig. 14. Energization of this magnet moves the drum X one step.

Energization of relay IVA2 also connects lead 11a with 11g which is the energizing lead for relay IIA3. This relay picks up and disconnects 11a from 11b—from 11d which is the energizing lead for relay IA7. As relay IA7 deenergizes, the locking bar M1 is returned. As the bar returns it raises the first hook K' of relay IIIA5, thereby breaking the contacts U', V', and permitting closing of the contacts H'', I'', under bar M1. Return movement of the bar also permits the hook K in relay 2A4 to close its contacts U, V, under the control of the armature F' in relay 2A4 which remains energized as long as the "two" key is held depressed.

Circuits have now been prepared under bar M1 at H'', I'', in relay IIIA5, and at U, V, in relay 2A4, while the circuit closed over U', V', in relay IIIA5 has been broken.

The "two" key is now released causing the relays 2A4, IVA2, IIA3 and BB to be deenergized.

The "four" key is depressed which, as in the case of the "two" key, connects plus from the battery to the "four" line which is the energizing lead for relay 4A4. This relay connects plus to line 11a connected over relay IIA3 to line 11b, connected over relay IVA3 to line 11c which, however, is disconnected at U', V', under locking bar M1 from line 11d which is the energizing lead of the relay IA7 so that this relay will not be energized. The line 11b is connected over the closed contacts H'', I'', under bar M1 to line 11i which is connected over a normal make and break contact in relay IVA3 with line 11k, connected over the closed contacts U', V', in relay IIIA5 under locking bar M2 with line 11L which is the energizing lead for relay 2A7 which operates the locking bar M2.

The locking bar M2 will be moved forward and returned and after the return of this bar, contacts U', V', in relay IIIA5 under locking bar M2 will be open while contacts H'', I'', under this bar will be closed. In relay 4A4 contacts U, V, will be closed. Drum X was shifted another step during this operation.

The "six" key is now depressed. This energizes relay 6A4 which completes a circuit from plus over lines 11a, 11b, contacts H'', I'', under locking bar M2, over a normal make and break contact in relay IVA3 with a line leading over contacts U', V', in relay IIIA5 under locking bar M3 to the energizing lead for the relay 3A7 which operates the locking bar M3. After this operation is completed, contacts U', V', in relay IIIA5 under bar M3 will be open, contacts H'', I'', in relay IIIA5 under bar M3 will be closed, contacts U, V, in relay 6A4 under bar M3 will be closed, and the X drum will be in its third position.

The condition of the machine is now as follows:

The drum X has been shifted three steps connecting a lead 20b1 from the secondary register with a lead 20e from the locking bar M3 of the primary register so that if the lead 20b1 is activated, the current will continue over the closed contacts U, V, in relay 6A4 under bar M3. As the leads 20b2, 20b3 and 20b4 are successively activated, the current will continue over contacts U, V, under bar M2 in relay 4A4, contacts U, V, under bar M1 in relay 2A4, and over line 29a to release the function key that was depressed.

In the tabulating relay IIIA5, contacts U', V', under bars M1, M2, and M3 are open and contacts H'', I'', under bars M1, M2 and M3 are closed. No circuits are made over any of these contacts during transmission of numbers from the primary to the secondary register. These contacts must, however, be restored so that all of the contacts U', V', are closed and all of the contacts H'', I'', are open when another number is indexed.

*Transmission of the number in the primary register to the secondary register*

As the problem assumed is one of addition, this operation is performed under control of the TT key.

Upon depression of the key TT, the circuit for the relay VV will be broken, thus permitting the locking arm SS to function to hold this key depressed and to prevent depression of the keys SU and RR. The switches ZY and ZX are closed upon further depression of the key TT connecting plus to lines 14a and 20a, and upon complete depression switch ZZ will connect plus to line 19a.

Line 19a is the energizing lead for the tabulating relays in both registers, for the tabulating relay IIIA5 and its power relay XIA1 in the primary register Figs. 1, 2 and 15, and for the tabulating relays XIA5, XIIA5 and XIIIA5 and the power relay XIVA1 associated with relays XIA5 and XIIA5, in the secondary register, Figs. 3, 4 and 17. This causes all of the contacts U', V' in the tabulating relays to close and all of the contacts H'', I'' to open.

Line 20a connects plus to the contacts I'' of relays XIA5 and XIIIA5, Fig. 17, and also connects plus to the contacts V' under the bar M1 in relays XIA5 and XIIIA5. In relay XIIIA5 line 20a is connected over U', V', to the locking bar M1 of the secondary register, and plus from line 20a continues over the zero contacts U, V, under this bar, over line 23a, over the corresponding normal make and break contact in relay XVIIA3, Fig. 16, to line 23k which is connected to all of the zero spring contacts in the addition relays 0A2 to 9A2.

Over the contacts U', V', in relay XIA5, Fig. 17, plus from line 20a continues to line 20b1 which, in Fig. 14, is connected to the first contact c on the drum X.

Lead 14a which upon partial depression of the key TT was connected to plus, has, by circuits previously described, caused energization of the coil of drum X and the relay MM with the result that the contacts d in drum X now engage the contacts c, and that the driving mechanism for the drums has been positioned to shift the drum Y when the next number is entered in the primary register.

Connecting plus to lead 14a has also, by circuits previously described, caused energization of relay IVA3, Fig. 15, which has shifted the circuit connections so that as the digits of the next number are indexed, they will be entered successively under bars M5, M4, M3, M2 and M1, that is, from left to right, Fig. 15. A number may, if desired, be entered in the primary register as the number contained therein is being transmitted.

The circuit over the closed contacts U', V', in relay XIA5 under bar M1 of the secondary register upon energization of the coil of the drum X is extended from line 20b1 across the contacts c and d to line 20e which, as shown in Fig. 15, is connected to bar M3 over closed contact U, V, in relay 6A4 to the "six" line 21g which, in Fig. 16, is connected over a normal make and break contact in relay XVA3 with the energizing lead of lines 21k to 21t of the addition relay 6A2.

In the relay 6A2, the zero line which is connected to plus over the zero contacts under the bar M1 of the secondary register is extended to the "six" line 24g of lines 24a to 24j over a normal make and break contact in relay XVIIIA3 to line 24q in cable 24k to 24t, to relay 6A4 of the secondary register, Fig. 17, which then picks up. As relay 6A2 picks up it connects battery with 26c which in Fig. 17 is shown to be the holding line for the secondary register relays.

The line 25a is normally connected over a break contact in relay XXA3 to line 32a which is connected with line 26c over a closing contact in relay 6A4. This line 25a is extended over the hook contacts U', V', in relay XIIA5 under bar M1 of the secondary register to line 25b which is the energizing lead for the locking bar operating relay 1A7 for the locking bar M1. As plus was connected to line 19a it energized relay XIIA5 and closed all of the hook contacts U', V. ' Consequently, the operating relay 1A7 is energized after the relay 6A4 is energized. The bar M1 is operated to permit the relay 6A4 to operate its armature F' under this bar which in turn permits the associated hook contacts U, V, to close as the bar M1 is returned.

The relay 1A7 connects plus to the energizing lead for relay XXIIA2. This relay closes a holding circuit from line 26c, and causes energization of relay XXA3 which in turn causes deenergization of relay 1A7. The interruption of lead 20a in relay XXA3 disconnects the contacts I'' from battery thus preventing a circuit from being closed over the second bar M2 before the bar M1 has returned. The locking bar M1 drops back, the associated contacts U, V, in relay 6A4 close, contacts U', V', in relays XIA5, XIIA5 and XIIIA5 open, the contacts H'', I'', in relays XIA5, XIIA5 and XIIIA5 close.

The next circuit from 20a over relay XIA5 will extend over contacts H'', I'', under bar M1, and contacts U', V', under bar M2, to line 20b2 and over the reversing drum X to bar M2 of the primary register, over closed contacts U, V, in relay 4A4, and over relay XVA3, Fig. 16, to relay 4A2 of the adding mechanism.

The circuit from 20a will extend over contacts H'', I'', of relay XIIIA5, under bar M1, over contacts U', V', under bar M2 of the secondary register, zero contacts U, V, over a line in 23a to 23j, over relay XVIIA3, over line 23k of lines 23k to 23t, to the zero line in the addition relays 0A2 to 9A2, over the contacts in energized relay 4A2 to line 24e of lines 24a to 24j, over relay XVIIIA3, the "four" line in cable 24k to 24t, to relay 4A4 of the secondary register.

Lead 25a will be extended through relay XIIA5 over contacts H'', I'', under bar M1, over contacts U', V', under bar M2, to the energizing lead for the operating relay 2A7 of the secondary register. Relays 4A4 and 2A7 are energized.

After this operation, contacts U, V, under bar M2 in relay 4A4 will be closed, contacts H'', I'', in the relays XIA5, XIIA5 and XIIIA5 will be closed, while contacts U', V', will be open. The circuits will be shifted so that plus will be connected over bar M3 of the secondary register to relay 0A2 of the addition device, and plus will also be extended over bar M1 of the primary register and contacts U, V, in relay 2A4 to the energizing lead for relay 2A2 of the addition device. The zero line in the addition device will be extended over the closed contact in relay 2A2 to relay 2A4 of the secondary register. The operation will continue as before, operating the bar M3 and closing contacts U, V, in relay 2A4 under bar M3, and closing contacts H'', I'', in relays XIA5, XIIA5 and XIIIA5 under bar M3, and opening contacts U', V', under this bar.

The circuit connections are now shifted so that bar M4 of the secondary register is connected to the plus lead 20a, the circuit continues over the drum X to a line 29a which energizes relay XXVIIA2, Fig. 14, to connect plus to lead 12a. Relay VV picks up and withdraws the hook SS thus permitting the key TT to release. As the key TT is released it disconnects lead 14a from plus and deenergizes the drum X. The release of the key TT again energizes the relay VV.

The condition of the machine is as follows:

Assuming that no number was set up in the primary register as transmission took place, the relay MM is held energized to hold the drum actuating pawls in position to operate the drum Y. In the primary register the contacts U, V, under bars M1, M2 and M3 are still closed, all of the contacts U', V', under these bars are closed while the contacts H'', I'', under this bar are open. In the secondary register the digit six (6) is stored under bar M1, digit four (4) under bar M2 and digit two (2) under bar M3. The contacts U', V', under these bars are open while the contacts H'', I'', are closed. These will be restored as stated before, when the key TT is again depressed.

*Entry of the second number in the primary register*

The number 194 is indexed on the digit keys by depressing the "one", "nine" and "four" keys in succession. Contacts U, V, in relay 1A4 will be closed under M5 under control of the relay IVA3, Fig. 15, which is energized. Contacts U, V, under bar M4 in relay 9A4 will be closed, and contacts U, V, under bar M3 in relay 4A4 will be closed. The drum Y is now shifted three steps.

*Transmission and addition*

In the secondary register, contacts U, V, under bar M1 in relay 6A4 are closed, contacts U, V, under bar M2 in relay 4A4 are closed, and contacts U, V, under bar M3 in relay 2A4 are closed, representing the number 246.

In the primary register contacts U, V, under bar M5 in relay 1A4 are closed, contacts U, V, under bar M4 in relay 9A4 are closed, and contacts U, V, under bar M3 in relay 4A4 are closed, representing the number 194.

The key TT when depressed operates as before, but the circuits over relay XIA5 will, under control of the Y drum, be extended successively over bars M3, M4 and M5 of the primary register to successively energize relays 4A2, 9A2 and 1A2 of the addition device, as the digit lines over these relays are successively connected to plus over the locking bars M1, M2 and M3 of the secondary register, as before, under control of the relay XIIIA5, Fig. 17. The operating relays 1A7 to 5A7 of the secondary register operate in the same order as before.

Although the contacts U, V under bar M1 in relay 2A2, and under bar M2 in relay 4A2 are still closed, they will have no effect on the transmission, since the lines 20c and 20d will not receive current from lines 20b1 to 20b5, since as just explained, the drum Y has been shifted only three steps.

As the relay 4A2 of the addition device is energized under control of the closed contacts U, V, in relay 4A4 of the primary register at the time the "six" digit line extending over the addition relays 0A2 to 9A2 is connected to plus, the digit line will be extended to the zero line of 24a to 24j and to the 0A4 relay of the secondary register. Zero will then be stored under the bar M1.

The addition of 4 and 6 necessitates a carry. The "six" digit line through relays 0A2 to 9A2 is branched off to the relay XXVA2, Fig. 16, marked ten (10), which connects plus to line 27a which is the energizing lead for the relay XXVIA6, Fig. 17, which in turn closes the energizing circuit 28a for the transfer relay XVA3, Fig. 16. This circuit is maintained until the locking bar M2 in the secondary register is moved. The relay XVA3, connects each of the incoming lines 21a to 21j to a line one unit higher.

The addition of 4 and 9 proceeds, the contact U, V, in relay 4A4, under locking bar M2 of the secondary register activating the "four" line of the addition relays. The line 21j representing nine under the locking bar M4 of the primary register is switched in the transfer relay XVA3 to the energizing lead for relay 0A2. The "four" line from the secondary register is extended to energize relay 4A4 of the secondary register and "four" will register under locking bar M2.

In the transfer relay XVA3, the circuit is extended from 21j over line a' to a closing contact in 0A2, to line a'' which is the energizing lead for a relay XXVA2 marked (9). This closes the circuit 27a which energizes the relay XXVIA6, Fig. 17, which as before closes the circuit for transfer relay XVA3.

The circuit over locking bar M3 on the contact U, V, in relay 2A4 in the secondary register, activates the "two" line in the addition mechanism, while the circuit over bar M3 and contact U, V, of relay 1A4 of the primary register under control of the transfer relay XVA3, energizes the relay 2A2, so that the "two" line will be extended over this relay to energize relay 4A4 in the secondary register closing the U, V, contacts under bar M3 in relay 4A4.

The circuit over bar M4 of the secondary register extends over the drum Y to line 29a causing the energization of relay VV and the release of the key TT and the consequent release of the coil of the drum Y and restoration of the drum and restoring the mechanism as shown in Fig. 14. The drum X may have been shifted in the meantime as shown if a third number is to be added.

*Subtraction*

The numbers 246 and 194 are entered in to the secondary and primary registers as before.

The subtraction key SU is depressed which effects the same control as the key TT, and in addition thereto connects the energizing lead 33a for the subtraction relays XVIIA3 and XVIIIA3 to plus. This connects the lines 23a to 23j to lines 24a to 24j, and the lines 24k to 24t to the lines 23k to 23t. The "six" from the secondary register comes in over line 24g and is connected in the energized relay 4A4 to the "two" line 23m connected over XVIIIA3 to the "two" line 24m energizing relay 2A4 of the secondary register.

Next the "four" comes in over 24e and goes out of relay 9A2 to the "five" line 23p over 24p to relay 5A4 of the secondary register. This subtraction necessitated borrowing and a branch line energized relay XXVA2 marked (13) and resulted in energizing the transfer relay XVA3.

Next the "two" from the secondary register comes in over 24c and leaves relay 2A2 on the zero line 23k to 0A4 of the secondary register. The "one" line 21b from the primary register was switched in relay XVA3 to the energizing lead 21m of relay 2A2.

The next circuit which is over bar M4 of the secondary register, extends over the energized drum X or Y as the case may be, to line 29a releasing the key SU, etc. as before.

*Printing*

As the numbers are transmitted through the adding and subtracting mechanism from the primary register, they are printed by the mechanism shown in Fig. 18 under control of leads 21a' to 21j' connected to the leads 21a to 21j, Fig. 15.

*Printing the result on the secondary register without clearing it*

If it is desired to print the result of an addition or subtraction registered in the secondary register and to retain the result registered therein, the key RR is depressed. This key does not connect plus to 14a to energize the drums X and Y as the number in the primary register does not enter into this process. This key connects plus to lines 19a and 20a as in the case of the keys TT and SU to restore the tabulating relays and to start transmission.

This key also connects 34a to plus to energize the relays XXIXA3 and XXXA2, Fig. 18, to connect the lines 20b1 to 20b5 to a line 35a which is connected in Fig. 16 to the energizing lead for the addition relay 0A2 so that this relay will be energized by the circuits over the bars M1 to M5 of the secondary register.

The relay XXIXA3, Fig. 18, disconnects the lines 21a' to 21j' from the printing magnets VW and places these magnets under control of circuits 24k'' to 24t'' connected as in Fig. 17 to the cable 24k to 24t which are the energizing leads for relays 1A4 to 9A4 of the secondary register.

The amounts in the secondary register are now transmitted successively over the 0A2 relay of the addition mechanism and simultaneously printed and re-registered in the secondary register ister in the same position in which they were registered originally. The locking arm SS will release the key RR when the circuit is closed over the line 11o at the conclusion of the re-registration.

*Clearing the secondary register*

The key TR when depressed connects plus to lead 36a which as shown in Fig. 19 energizes the relay XXXIA3 connecting all of the lines 25b1 to 25b5 to the plus carrying line 25a, Fig. 17, and connecting also lead 24k''' to lead 36a. Lead 24k''' is connected to the lead 24k, Fig. 17, which energizes relay 0A4 of the secondary register. Leads 25b1 to 25b5 are branched off from the energizing leads of the operating relays 1A7 to 5A7, Fig. 17. As the operating bars M1 to M5 are operated forwardly all of the closed contacts U, V, in the storing relays are opened. When the bars are returned, the hook contacts U, V, in relay 0A4 are closed, thus registering zero under each of the bars M1 to M5 of the secondary register.

If a transfer is necessary after addition of the last digit in the primary register has been made, the transmitting circuit over the drum to line 29a will be continued over the closed contacts U, V, of the transfer controlling relay XXVIA6 to line 29b which in Fig. 16 is connected to line 21a which as the transfer relay XVA3 is energized is connected to the energizing lead of the addition relay 1A2. This contact U, V, XXVIA6 is closed whenever the other contact U, V, in this relay is closed and causes energization of the transfer relay XVA3.

This continues as long as the contacts U, V, in relay XXVIA6 are closed for purposes of transfer. When no further carries are necessary, contacts F' and U will be closed closing the break in line 29a which the energizing lead for relay XXVIIA2 which closes the energizing circuit for relay VV which in turn causes release of the key TT.

If the capacity of the secondary register has been exceeded by addition, the relay VV will be energized by the circuit over line 11o which flashes the lamp La as described.

While the invention has been described in connection with the embodiment disclosed, it is to be understood that equivalents of features and combinations of features disclosed and other uses will occur to those skilled in this art and arts in which this invention may be practical, and that the words used are used for purposes of description and are not to be considered as words of limitation.

What is claimed as new is:

1. The combination of a series of movable circuit closing contact members, a relay associated with each member, a common element for moving all of said contacts into full open position and for permitting them to move toward closed position, an armature in each relay for controlling its associated contact to remain open when the relay is deenergized and to close when the relay is energized, a camming connection between said armature and contact member to reduce the required movement of said armature, and means on said element functioning when the element is in its home position to prevent operation of any said armatures into a position in which they permit closing of their respective contacts.

2. The combination of a series of relays, a movable and a fixed circuit closing contact associated with each relay, a non-conducting armature associated with the movable contact in each relay for controlling the position of said movable contact, common means for the movable contacts for moving them into full open position to permit any of the associated armatures to move into contact closing position when the corresponding relay is energized, and means associated with said common means and operable in the normal position of said common means to prevent movement of the armatures.

3. The combination of a series of relays, a series of movable contacts associated with each relay, a common member for corresponding movable contacts of the several relays for opening closed contacts in said series and subsequently permitting any contacts to close, and separate operating means for each member.

4. The combination of a series of relays, a series of movable contact carrying members associated with each relay, a series of armatures in each relay for controlling the open and closed position of said members, a bar associated with corresponding movable contact members of the several relays, and an operating magnet for each bar.

5. The combination of a series of relays, a series of movable contact carrying members associated with each relay, a series of armatures in each relay for controlling the open and closed position of said members, a bar associated with corresponding movable contact members of the several relays, an operating magnet for each bar, and means controlled by said bars for energizing said operating magnets successively.

6. The combination of a series of relays, a series of movable contact carrying members associated with each relay, a series of armatures in each relay for controlling the open and closed position of said members, a bar associated with corresponding movable contact members of the several relays, an operating magnet for each bar, a tabulating relay associated with said series of relays, a series of movable contacts associated with said tabulating relay for closing energizing circuits for said operating magnets, and means associated with said bars for controlling the movable contacts in said tabulating relays to close the energizing circuits for said operating magnets in succession.

7. The combination of a series of relays, a series of movable contact carrying members associated with each relay, a series of armatures in each relay for controlling the open and closed position of said members, a bar associated with corresponding movable contact members of the several relays, an operating magnet for each bar, a tabulating relay associated with said series of relays, a series of pairs of closed and open contacts in said tabulating relay, each pair of contacts being associated with one of the bars and each closed contact closing an energizing circuit to the respective operating magnet, and means operated by the movement of any bar for opening the associated closed contact in the energizing circuit for its operating magnet and for closing the associated open contact to establish an energizing circuit for the operating magnet for the adjacent bar.

8. The combination of a series of digit relays, a series of denominational contacts associated with each relay, denominational bars each common to the corresponding denominational contacts of the several relays for opening and closing said contacts, a series of armatures in each relay for controlling the position of said contacts, means for selectively energizing said relays, an operating magnet for each bar, and means energizing said magnets in succession as said relays are energized selectively.

9. The combination of a series of digit relays, a series of denominational contacts associated with each relay, denominational bars each common to the corresponding denominational contacts of the several relays for opening and closing said contacts, a series of armatures in each relay for controlling the position of said contacts, means for selectively energizing said relays, an operating magnet for each bar, and means controlled by movement of a bar for switching the next energizing impulse for said operating magnets to the operating magnet associated with the adjacent bar.

10. The combination of a series of digit relays, a series of denominational contacts associated with each relay, denominational bars each common to the corresponding denominational contacts of the several relays for opening and closing said contacts, a series of armatures in each relay for controlling the position of said contacts, means for selectively energizing said relays, an operating magnet for each bar, a circuit switching relay provided with contacts for preparing energizing circuits to said operating magnets, and means operated by said bars for operating said contacts to prepare a circuit to the operating magnet for the next adjacent bar.

11. The combination of a series of digit relays, a series of denominational contacts associated with each relay, denominational bars each common to the corresponding denominational contacts of the several relays for opening and closing said contacts, a series of armatures in each relay for controlling the position of said contacts, means for selectively energizing said relays, an operating magnet for each bar, means for causing said operating magnets to be energized in succession in one direction as said relays are selectively and successively energized, and means for automatically causing said operating magnets to be energized in succession in the opposite direction upon subsequent selective and successive energization of said digit relays.

12. The combination of a series of digit relays, a series of denominational contacts associated with each relay, denominational bars each common to the corresponding denominational contacts of the several relays for opening and closing said contacts, a series of armatures in each relay for controlling the position of said contacts, means for selectively energizing said relays, an operating magnet for each bar, a tabulating relay comprising a series of contacts, means operated by the bars for shifting said contacts to prepare circuits for said operating magnets in succession, and means for simultaneously restoring the contacts in said tabulating relay to normal position.

13. The combination of a series of digit relays, a series of denominational contacts associated with each relay, a bar common to all of the contacts of the same denominational order for opening closed contacts and permitting contacts of energized relays to close, a separate operating magnet for each bar, and switches controlled by said bars whereby movement of any bar will prepare energizing circuits for the operating magnet operating the next adjacent bar.

14. The combination of a series of digit relays, a series of denominational circuit contacts in each relay, circuits prepared thereby, means for closing said contacts in denominational order as the relays are successively energized, a series of circuit lines, and a multi-position switch member operated as each contact is closed for relatively positioning said prepared circuits and the corresponding circuits in said series of circuit lines for mutual co-operation.

15. The combination of a series of digit relays, a series of denominational circuit contacts in each relay for preparing circuits, means for closing said contacts in denominational order as the relays are successively energized, a series of circuit lines, a reversing drum comprising a rotatable multi-contact switch member operated as each contact is closed, a plurality of contacts in said rotatable member, line circuits extended to said contacts, a plurality of normally open contact members associated with the contacts of said rotatable member and respectively in electrical connection with the circuits prepared over the closed contacts in said digit relays, and means for closing said contacts.

16. The combination of a series of digit relays, a series of denominational circuit contacts in each relay for preparing circuits, means for closing said contacts in denominational order as the relays are successively energized, a series of circuit lines, a reversing drum comprising a rotatable multi-contact switch member operated as each contact is closed, a plurality of contacts in said rotatable member, said circuit lines being extended to said contacts, a plurality of normally open contact members associated with the contacts of said rotatable member and respectively in electrical connection with the circuits prepared over the closed contacts in said digit relays, and means for simultaneously closing all of said open contacts to simultaneously prepare circuits over said denominational digit contacts and reversing drum to the respective circuit lines.

17. The combination of a series of digit relays, a series of denominational circuit contacts in each relay for preparing circuits, means for closing said contacts in denominational order as the relays are successively energized, a series of circuit lines, a reversing drum comprising a rotatable multi-contact switch member operated as each contact is closed, a plurality of contacts in said rotatable member, said circuit lines being extended to said contacts, a plurality of normally open contact members associated with the contacts of said rotatable member and respectively in electrical connection with the circuits prepared over the closed contacts in said digit relays, a relay for simultaneously closing said open contacts, and means for energizing said relay.

18. The combination of a series of digit relays, a series of denominational contacts in said relays, means for selectively energizing said relays, means for closing said contacts in denominational sequence in one direction, means for completing circuits over said contacts in the opposite direction for purposes of transmission, and means for closing said contacts in denominational sequence in the said opposite direction under energization of said digit relays immediately after transmission is initiated.

19. The combination of a series of digit relays, a series of denominational contacts in said relays, a keyboard for selectively energizing said relays to introduce a number comprising one or more digits, means for closing said contacts in denominational sequence in one direction as the digits of the number are indexed on the keyboard, and means for controlling the closing of said contacts in the opposite direction as the digits of the next number are indexed on the keyboard.

20. The combination of a series of digit relays, a series of denominational contacts in said relays, a keyboard for selectively energizing said relays to introduce a number comprising one or more digits, means for closing said contacts in denominational sequence in one direction as the digits of the number are indexed on the keyboard, means for successively completing circuits over said contacts in the reverse direction in which they were closed, and means whereby another number may be indexed and corresponding digit contacts closed simultaneously as the first number is transmitted, and in the direction in which the digits of the first number are transmitted.

21. The combination of a keyboard, a storage mechanism controlled by the keyboard comprising means for storing digit values of a number in denominational sequence, accumulating means adapted to be controlled by said storage mechanism as determined by the digit values stored, and means whereby a second number may be entered in said storage mechanism coincidentally with the operation of the storage mechanism in controlling the accumulating mechanism.

22. In an electrical calculating machine of the class described, the combination of a primary storage register, a secondary storage register, each register comprising a plurality of series of digit contacts for receiving denominational digits of numbers, a computing mechanism, a tabulating relay associated with the secondary register for establishing circuits over the digit contacts of the primary register to the computing mechanism, another tabulating relay associated with the secondary register for establishing circuits over the digit contacts of the secondary register to the computing mechanism, and a third tabulating relay associated with the secondary register for controlling the entry of the digits of the result computed in the computing mechanism in denominational sequence in the secondary register.

23. In an electrical calculating machine, the combination of a register comprising a plurality of denominational series of digit contacts, and a tabulating relay comprising switching contact armatures for establishing circuits over the denominational series of contacts in denominational sequence.

24. The combination of primary and secondary registers, each comprising a plurality of denominational series of digit contacts, a tabulating relay comprising a series of switching devices for establishing circuits over the contacts of the primary register in denominational sequence.

25. The combination of a register comprising a plurality of denominational series of contacts, and a tabulating relay comprising a plurality of shiftable circuit closing members for controlling the entry of amounts in sequential denominational order.

26. The combination of a register comprising a plurality of denominational series of digit contacts, and tabulating relays associated with said register each comprising a denominational series of movable switching contacts for establishing transmission circuits over said contacts in denominational sequence and closing said contacts in denominational sequence.

27. The combination with a register comprising a series of digit relays each comprising a series of denominational contacts, means for energizing said relays selectively, a denominational operating magnet associated with each denomination for controlling the closing of contacts therein, and means for energizing said magnets in the same sequential order for successive amounts.

28. In an electrical calculating machine, the combination of a primary register, a secondary register, computing mechanism operable under control of the primary and secondary registers for controlling the entry of amounts into the secondary register, means for transmitting digits of corresponding denominational orders in the secondary register successively over the said computing mechanism and the successive results into said secondary register, a multiple contact transfer relay, and two pairs of contacts for continuing the transmission from the secondary register over the digit "one" relay of the calculating mechanism after transmission over the primary register has ceased for purposes of adding transfers, one of said pairs completing a circuit for energizing the transfer relay and the other pair completing a circuit through the transfer relay for completing a circuit to the said digit "one" relay.

29. The combination of primary and secondary registers, means for setting up amounts in said registers, means transmitting said amounts to a computing mechanism and the result from the computing mechanism to the secondary register, a key for controlling such transmission, means for locking the key when depressed, and means for releasing said key after the amount on the primary register has been transmitted when no transfer is involved in computation in which the last digit transmitted was involved, and means preventing release of said key when such computation necessitates a carry.

30. The combination of a primary register, a reversing mechanism associated therewith, a tabulating mechanism associated therewith for controlling the entry of digits in denominational sequence, a secondary register, tabulating relays associated with the secondary register for controlling the transmission over the primary and secondary registers in denominational sequence and for controlling the entry of a computed result in the proper sequence on the secondary register, and a clearing key restoring said reversing mechanism and said tabulating relays and for controlling the entry of zeros in the secondary register.

31. The combination of a series of digit relays, a denominational series of contacts associated with each relay, a computing mechanism comprising a series of relays and including contacts for closing circuits to said digit relays, a transfer relay included in the computing mechanism for adding carries, a locking bar associated with each series of contacts of the same denominational order of contacts in the digit relays, means for moving said bars to release all associated contacts and to free the contacts associated with the digit relay energized under control of the computing mechanism so that they can close, a relay adapted to be energized when carries are necessary, contacts associated with said latter relay for closing a circuit to said transfer relay, means normally urging said contacts into closing position, an armature associated with said latter relay and said contacts to control the position of said contacts, and means operated by any one of said bars for permitting movement of said armature as said latter relay is energized to permit closing of said contacts to establish a circuit for said transfer relay.

32. The combination of a series of digit relays each comprising a series of denominational contacts, a locking bar for each series of digit contacts of the same denominational order, a computing mechanism comprising result lines for energizing said digit relays, said computing mechanism including a transfer relay, mechanically self-closing contacts for establishing an energizing circuit for said transfer relay, means common to said bars for opening said last mentioned contacts and permitting them to close, and a relay controlled by said computing mechanism for permitting closing of said mechanically self-closing contacts.

33. In a machine of the class described, the combination of a primary register comprising a plurality of denominational series of digit contacts, a secondary register comprising a plurality of denominational series of digit contacts, a denominational series of switching contacts associated with the secondary register for controlling the transmission over the contacts in the primary register in denominational sequence, means for simultaneously moving all of said switch contacts to partially prepare circuits at this point to the several denominational series of contacts of the primary register, one of said switching contacts completely preparing a circuit to the units denominational contacts of the primary register, and means operated as digits are entered in the secondary register for shifting said one switching contact to break the circuit over the units denominational contacts of the primary register and to complete preparation in connection with the adjacent switching contact, of a circuit to the tens denominational series of contacts in the primary register.

34. The combination of a primary register and a secondary register each comprising a plurality of denominational series of circuit closing contacts, locking bars associated with the secondary register for releasing and permitting closing of the denominational series of contacts associated with this register in sequence, and means operated by said bars for establishing circuits to the contacts in the primary register in denominational sequence.

35. The combination with a register comprising a series of digit relays and a series of contacts of different denominational order associated with each relay, a locking bar associated with each series of digit contacts of the same denominational order for controlling the closing of the associated contacts of an energized digit relay, means for preparing transmission circuits over said contacts in denominational sequence, and means controlled by each locking bar as it is operated to prepare a transmission circuit for the contacts under the next higher order locking bar.

36. The combination with a register comprising a series of digit relays each relay comprising a plurality of denominational transmission circuit preparing contacts, a locking bar associated with each series of contacts of the same denominational order to release all the associated contacts and to permit associated contacts of energized digit relays to close, an operating magnet for each locking bar, and switching means associated with each bar and operated thereby for controlling the energization of the operating magnet for the next higher bar upon a subsequent energization of any of said digit relays.

37. The combination of primary and secondary registers each comprising a plurality of denominational series of digit contacts for preparing transmission circuits to a computing mechanism, a keyboard for controlling closing of the contacts in the primary register, means for controlling closing of said contacts in denominational sequence, means for controlling transmission over closed contacts in the secondary register in denominational sequence, means in the secondary register for controlling transmission over the closed contacts in the primary register in denominational sequence, and a reversing drum adjusted as contacts are closed in the primary register, to select, for transmission, the same denominational contacts in the primary register as those over which transmission is made in the secondary register.

38. The combination of primary and secondary registers each comprising a plurality of denominational series of contacts adapted to be closed to prepare transmission circuits, means associated with the secondary register to simultaneously prepare circuits over the contacts in both registers in denominational sequence, a multi-contact drum associated with the primary register and operated as amounts are entered in the primary register to adjust said prepared circuits from the secondary register for connection to the corresponding denominational series of contacts in the primary register, and means for closing the contacts in said drum for connecting said prepared circuits to said series of contacts in the primary register.

39. The combination of primary and secondary registers each comprising a plurality of denominational series of contacts adapted to be closed to prepare transmission circuits, means associated with the secondary register to simultaneously prepare circuits over the contacts in both registers in denominational sequence, a pair of multi-contact drums each comprising a plurality of fixed contacts to which said prepared circuits from the secondary register are connected, a relay associated with each drum, spring contacts in each relay for contact with said fixed contacts, said spring contacts being in electrical connection with the corresponding denominational series of contacts in the primary register, means for operating one of said drums as contacts are closed in the primary register, and means operated as transmission is initiated for energizing the adjusted drum and for controlling the drum operating mechanism to operate the other drum as contacts in the primary register are subsequently closed.

40. The combination of a register comprising a series of digit relays, a denominational series of contacts in each relay, means for controlling the opening and closing of said contacts in denominational sequence, and means for opening all closed contacts in the several denominational series simultaneously and for closing all zero contacts simultaneously.

41. The combination of a register comprising a series of digit relays, a denominational series of digit contacts in each relay, a locking bar for all the digit contacts of each denominational order, and means for simultaneously moving all of the locking bars to release all of the contacts in the register.

42. The combination of a register comprising a series of digit relays, a denominational series of digit contacts in each relay, a movable locking bar for all the digit contacts of each denominational order, and means to clear the register and to set up zeros under all of the bars by energizing the zero digit relay and also causing simultaneous movement of all of the bars.

43. The combination of a register comprising a series of digit relays, a denominational series of digit contacts in each relay, a locking bar for all the digit contacts of each denominational order, an operating magnet for each bar, means normally controlling a denominational sequential energization of said operating magnets, and means for controlling a simultaneous energization of said operating magnets.

44. The combination of a series of digit relays, a series of denominational circuit contacts in each relay, circuits prepared thereby, means for closing said contacts in denominational order as the relays are successively energized, a series of circuit lines, and a multi-position switch member operated as each contact is closed for determining which of the said prepared circuits will cooperate with the various circuit lines.

ROLF HOFGAARD.